(12) United States Patent
Boyce et al.

(10) Patent No.: US 8,747,989 B2
(45) Date of Patent: Jun. 10, 2014

(54) PATTERN PRODUCTION AND RECOVERY BY TRANSFORMATION

(75) Inventors: Mary C. Boyce, Winchester, MA (US); Tom Mullin, Chinley (GB); Stephanie Deschanel, Piolenc (FR); Katia Bertoldi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 484 days.

(21) Appl. No.: 12/538,499

(22) Filed: Aug. 10, 2009

(65) Prior Publication Data
US 2010/0009120 A1   Jan. 14, 2010

Related U.S. Application Data

(63) Continuation of application No. PCT/US2008/053673, filed on Feb. 12, 2008.

(60) Provisional application No. 60/889,345, filed on Feb. 12, 2007, provisional application No. 60/943,113, filed on Jun. 11, 2007, provisional application No. 60/972,349, filed on Sep. 14, 2007.

(51) Int. Cl.
| | |
|---|---|
| *B32B 3/24* | (2006.01) |
| *B32B 3/26* | (2006.01) |
| *G02B 1/00* | (2006.01) |
| *G02B 6/122* | (2006.01) |
| *B82Y 20/00* | (2011.01) |

(52) U.S. Cl.
CPC ............... *B32B 3/266* (2013.01); *G02B 1/005* (2013.01); *G02B 6/1225* (2013.01); *B82Y 20/00* (2013.01)
USPC .......................................................... 428/134

(58) Field of Classification Search
CPC ...... G02B 1/005; G02B 6/1225; B82Y 20/00; B32B 3/266
USPC .......................................................... 428/134
See application file for complete search history.

(56) References Cited

U.S. PATENT DOCUMENTS

| | | | | |
|---|---|---|---|---|
| 2002/0135863 | A1* | 9/2002 | Fukshima et al. | 359/298 |
| 2010/0150511 | A1* | 6/2010 | Arsenault et al. | 385/130 |
| 2011/0062635 | A1* | 3/2011 | Crosby et al. | 264/447 |

OTHER PUBLICATIONS

Jian et al., "Reversibly strain-tunable elastomeric photonic crystals" Chemical Physical Letters, XP-002483776, 2004, pp. 285-289.
Wu et al., "Tunable Phononic Band Gaps of Surface and Bulk Acoustic Waves in Two-Dimensional Phononic Crystals" 2004 IEEE Ultrasonic Symposium, pp. 1042-1045.

(Continued)

*Primary Examiner* — William P Watkins, III
(74) *Attorney, Agent, or Firm* — Gesmer Updegrove LLP

(57) ABSTRACT

A transformative periodic structure includes a plurality of elastomeric or elasto-plastic periodic solids that experiences a transformation in the structural configuration upon application of a critical macroscopic stress or strain. The transformation alters the geometric pattern changing the spacing and the shape of the features within the transformative periodic structure. For the case of elastomeric periodic structures upon removal of the critical macroscopic stress or strain, the transformative periodic solids are recovered to their original form. For the case of elasto-plastic periodic structures upon removal of the critical macroscopic stress or strain, the new pattern is retained. Polymeric periodic solids can be recovered to their original form by heating or plasticizing.

24 Claims, 27 Drawing Sheets

(56) References Cited

OTHER PUBLICATIONS

Arsenault et al., "From colour fingerprinting to the control of photoluminescence in elastic photonic crystals" 2006 Nature Publishing Group, XP 002483777, pp. 179-184.

Bertoldi et al., "Mechanically triggered transformations of phononic band gaps in periodic elastomeric structures" Physical Review B 2008, pp. 052105-1-052105-4.

Deschanel et al., "Pattern Transformation Triggered by Deformation" Physical Review Letters, Aug. 24, 2007, XP-002483778, pp. 084301-1-084301-4.

Sandrock et al., "A widely tunable refractive index in a nanolayered photonic material" Applied Physics Letters, vol. 84, No. 18, May 3, 2004, pp. 3621-3623.

Yoshino et al., "Mechanical Tuning of the Optical Properties of Plastic Opal as a Photonic Crystal" 1999, Japanese Journal of Applied Physics, vol. 38, 1999, pp. 786-788.

\* cited by examiner

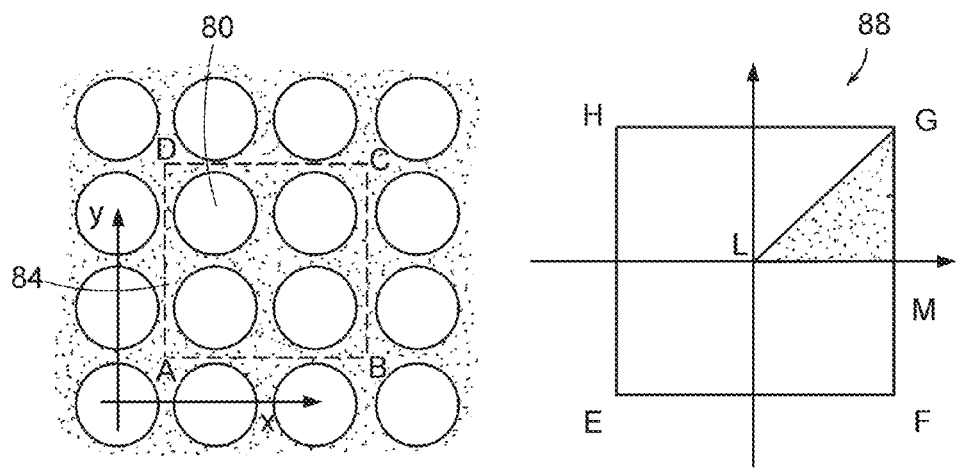
FIG. 17A
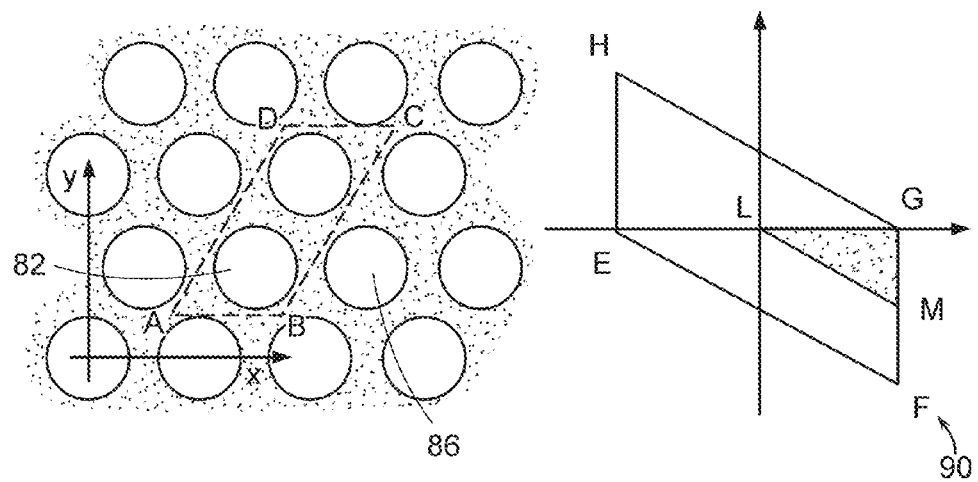
FIG. 17B
| FIG. 18A |
| --- |
| FIG. 18B |
| FIG. 18C |
| FIG. 18D |
FIG. 18

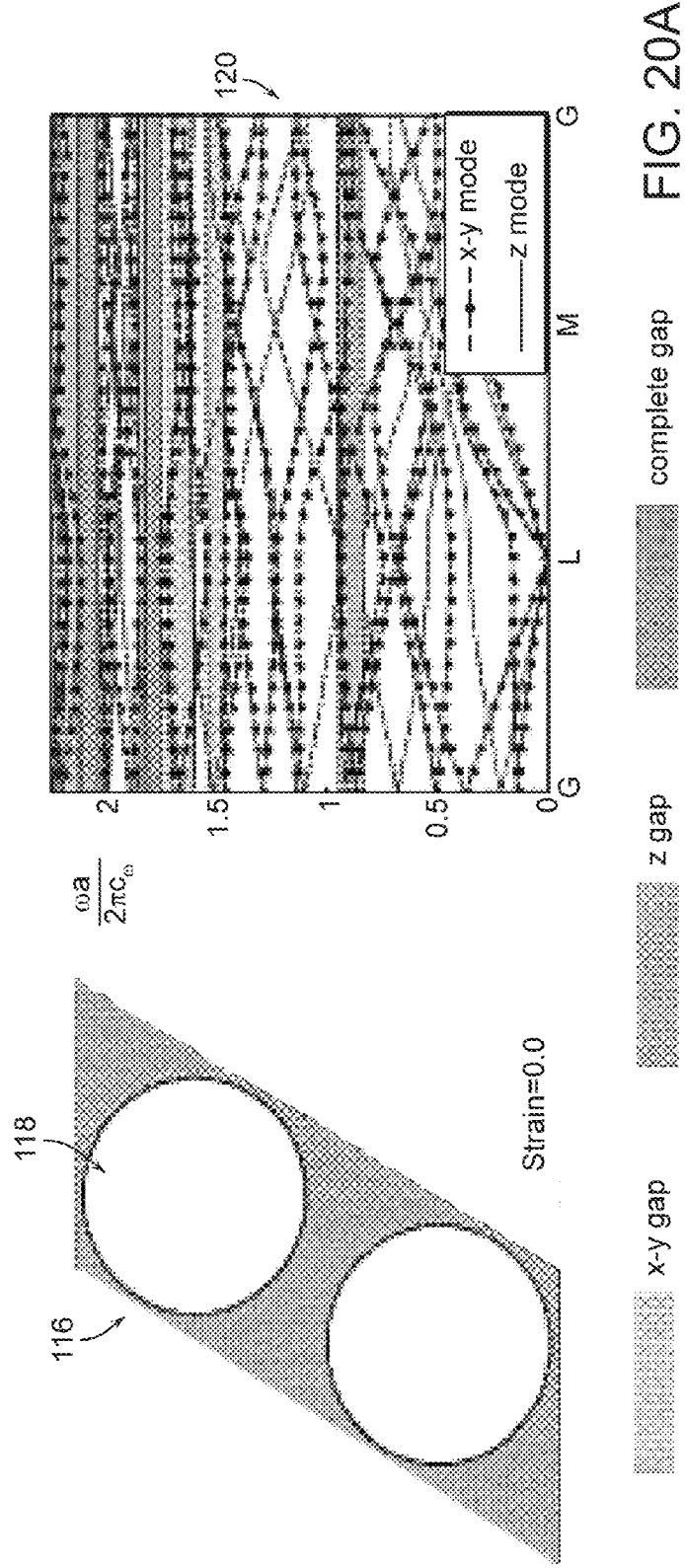

PATTERN PRODUCTION AND RECOVERY BY TRANSFORMATION

PRIORITY INFORMATION

This application is a continuation of International Application Serial No. PCT/US2008/053673 filed on Feb. 12, 2008 which claims priority to provisional application Ser. No. 60/889,345 filed on Feb. 12, 2007, provisional application Ser. No. 60/943,113, filed on Jun. 11, 2007, and provisional application Ser. No. 60/972,349, filed on Sep. 14, 2007, all of which are incorporated herein by reference in their entireties.

BACKGROUND OF THE INVENTION

The invention relates to the field of cellular solids as well as heterogeneous or filled materials, and in particular to materials possessing a periodic structure that experiences a transformation in the structural configuration upon application of a critical macroscopic stress or strain.

There are many examples of cellular solids in nature and they are mimicked in numerous synthetic materials ranging from heterogeneous foams to engineered honeycombs. These cellular structures are used in a wide variety of mechanical, acoustic and thermal applications. The connections between the microstructure of such materials and their macroscopic properties have been investigated by many researchers. Research into the mechanics and structural properties of cellular solids can be categorized according to the designed role of the material: high stiffness to weight; high strength to weight; or low density, high energy absorption materials. Energy absorption is achieved by capitalizing on the large deformations and collapse of the cellular structures when deformed beyond the initial linear elastic regime.

The nonlinear stress-strain behavior of foams which possess a heterogeneous cell structure and honeycombs which possess a periodic structure have been of particular interest. Under compression, the transition from linear elastic behavior to either a "yield" or plateau stress (or, in some instances, a "yield" with some subsequent strain hardening) has been found to result from an initial instability. This usually originates in the buckling of a member or a wall in the cell microstructure which then leads to localized deformation into bands. The collapse bands can progress through the structure at relatively constant stress. This energy absorbing, collapse behavior has been clearly demonstrated in experimental and modeling studies of a wide range of two-dimensional honeycomb structures including hexagonal and circular structures with different wall dimensions and elastic-plastic mechanical behavior. The two-dimensional periodic honeycomb structures have enabled investigators to vary different parameters in a controlled manner to study the effect of geometric features and imperfections on the onset of the instability and its subsequent localization into deformation bands.

As discussed above, cellular structures provide unique energy absorption opportunities through their nonlinear stress-strain behavior—particularly through the ability to undergo very large deformation at constant or near constant stress once localization takes place. While this mechanical function of cellular solids is of great importance, it should also be recognized that periodic structures also provide many other functions and/or attributes in natural materials. Studies on butterflies, beetles, moths, birds and fish have shown that the iridescent phenomena are related to the presence of surface and/or subsurface photonic crystal microstructures. Photonic crystals are composed of submicron structures with periodicity comparable to the wavelength of visible light which are designed to affect the propagation of electromagnetic waves. Therefore, they are attractive optical materials for controlling and manipulating light with applications including LEDs, optical fibers, nanoscopic lasers, ultrawhite pigment, radio frequency antennas and reflectors, and photonic integrated circuits. In a similar way, photonic crystals are periodic composite materials with lattice spacings comparable to the acoustic wavelength. They are of interest because of the profound effects of their periodic structure on wave propagation (e.g., the existence of acoustic band gaps), and because of potential applications as sound filters, transducer design and acoustic mirrors. Periodic submicron structures are also employed to obtain super-hydrophobicity. Microtextures that modify the wettability of the material have been found in the leaves of about 200 plants, including asphodelus, drosera, eucalyptus, euphorbia, gingko biloba, iris, lotus and tulipa, as well as in butterfly wings, duck feathers, bugs and desert beetles.

Recently, the ability to synthetically produce periodic structures at the micron and submicron length-scales through microfabrication, interference lithography, as well as thermodynamically-driven self-assembly has created new opportunities to mimic natural structures and properties. These periodic structures are generally static or, in some instances, change in a more or less affine nature with deformation or other external stimuli. Hence, properties which are dependent on the precise length scale and/or spacing of the periodic features will exhibit a gradual monotonic change with deformation.

SUMMARY OF THE INVENTION

According to one aspect of the invention, there is provided a transformative elastomeric periodic structure. The transformative periodic structure include a plurality of elastomeric periodic solids that experiences a transformation in the structural configuration upon application of a critical macroscopic stress or strain, said transformation alters the geometric pattern changing the spacing and the shape of the features within the transformative periodic structure. Upon removal of the critical macroscopic stress or strain, the elastomeric periodic solids are recovered to their original form.

According to another aspect of the invention, there is provided a transformative elasto-plastic periodic structure. The transformative periodic structure include a plurality of elasto-plastic periodic solids that experiences a transformation in the structural configuration upon application of a critical macroscopic stress or strain, said transformation alters the geometric pattern changing the spacing and the shape of the features within the transformative periodic structure. Upon removal of the critical macroscopic stress or strain, the new pattern is retained. Polymeric periodic solids can be recovered to their original form by heating or plasticizing.

According to another aspect of the invention, there is provided a method of forming periodic structures with complex patterns. The method includes forming a plurality of periodic solids with complex patterns from periodic structures. Also, the method includes transforming the structural configuration of said elastomeric period solids upon application of a critical macroscopic stress or strain by altering the geometric pattern changing the spacing and the shape of the features within the transformative periodic structure. Upon removal of the critical macroscopic stress or strain, the elastomeric periodic solids are recovered to their original form or alternatively the new pattern can be retained upon cooling below a critical temperature such as the glass transition temperature and/or by cross-linking prior to unloading.

According to another aspect of the invention, there is provided a transformative periodic structure comprising a multiple levels of periodicity. The transformative periodic structure include a plurality of periodic solids that experiences a transformation in the structural configuration upon application of a critical macroscopic stress or strain, said transformation alters the geometric pattern within subdomains of periodicity changing the spacing and the shape of the features within these domains.

According to another aspect of the invention, there is provided a transformative photonic crystal structure. The transformative photonic crystal structure includes a plurality of elastomeric periodic solids that experiences a transformation in the structural configuration upon application of a critical macroscopic stress or strain. The transformation alters the geometric pattern changing the spacing and the shape of the features within the transformative periodic structure. Upon removal of the critical macroscopic stress or strain, the elastomeric periodic solids are recovered to their original form.

According to another aspect of the invention, there is provided a transformative phononic crystal structure. The transformative photonic crystal structure includes a plurality of elastomeric periodic solids that experiences a transformation in the structural configuration upon application of a critical macroscopic stress or strain. The transformation alters the geometric pattern changing the spacing and the shape of the features within the transformative periodic structure. Upon removal of the critical macroscopic stress or strain, the elastomeric periodic solids are recovered to their original form.

BRIEF DESCRIPTION OF THE DRAWINGS

FIGS. 17A-17B are schematic diagrams illustrating square and oblique infinite array of circular voids;

DETAILED DESCRIPTION OF THE INVENTION

The invention proposes a material possessing specifically engineered periodic structures that experience a transformation in the structural configuration upon application of a critical macroscopic stress or strain. For the case of elastomeric matrices, the transformation is a result of an elastic instability and is reversible upon unloading and repeatable with successive loading excursions. For the case of elasto-plastic matrices the new pattern retained upon unloading. Polymeric periodic solids can be recovered to their original form by heating or plasticizing.

This invention has been demonstrated on structural patterns created with the pattern lengthscale at the millimeter, but is equally applicable to structures possessing the same periodic patterns at a smaller lengthscale (e.g., micrometer, submicrometer, nanometer lengthscales). The mechanically adaptive nature of these material structural patterns enable new classes of materials with mechanically tunable attributes and properties; depending on the lengthscale of the pattern, these materials will change attribute and/or property triggered by the application of a critical stress or strain level (for example, providing a change in color, a change in sound transmission or a change in hydrophobicity upon the application of a critical stress or strain level). Tunable attributes include photonic applications (for example, color tuning, photonic bandgap), phononic applications (for example, acoustic mirror, sound or vibrations suppression), hydrophobic/hydrophilic applications (water channeling, harvesting, repulsion), adhesion release.

Figure 1A:
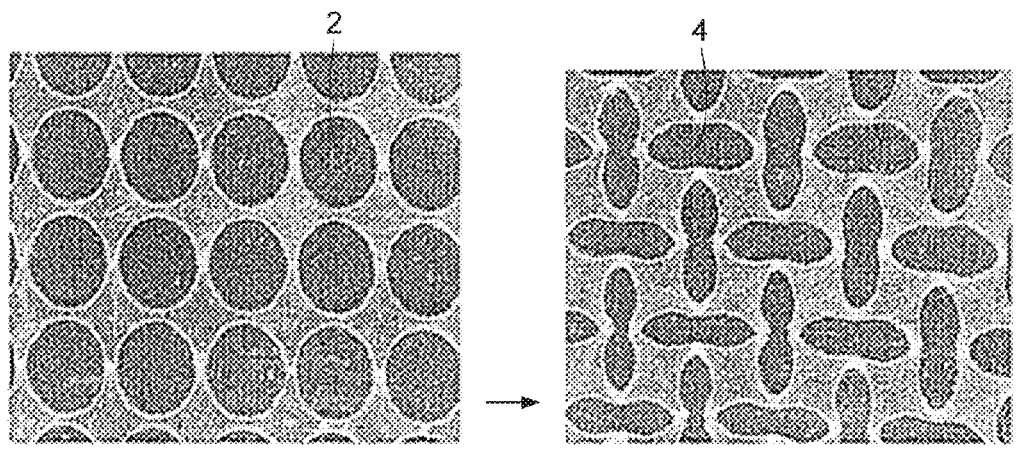
FIG. 1A-1C are TEM diagrams illustrating the behavior of three different representative periodic patterns upon the application of compression in the vertical direction.
Figure 1B:
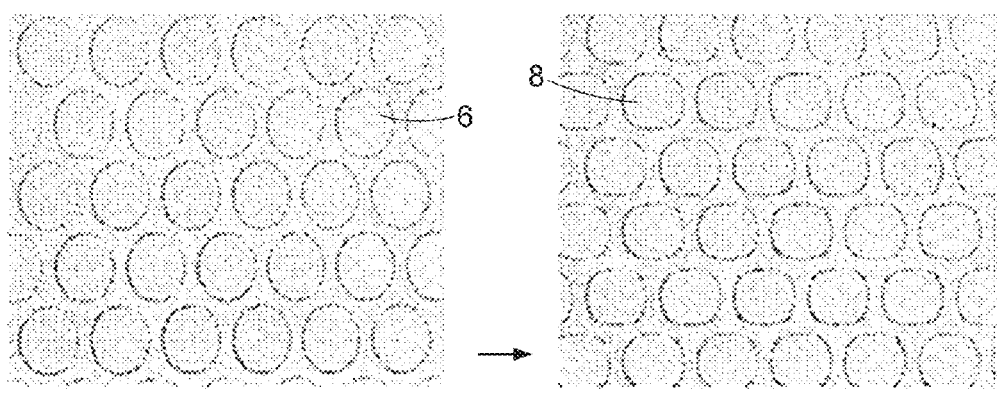
Figure 1C:
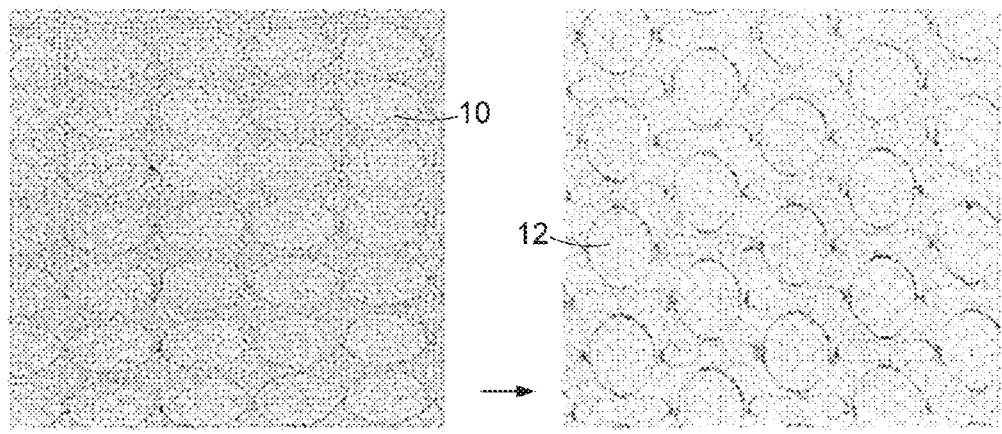

FIGS. 1A-1C shows the behavior of three different representative periodic patterns upon the application of compression in the vertical direction. FIG. 1A shows a square array of circular holes 2 which is found to suddenly transform, upon reaching a critical applied stress, to a periodic pattern of alternating, mutually orthogonal, ellipses 4. In contrast, FIG.

1B shows the compression of an oblique array of circular holes 6 where the oblique array is found to transform into one of sheared voids where the shear direction alternates back and forth from row to row 8. FIG. 1C shows the behavior of a regular array of elliptical holes 10 which are found to transform to the pattern of nearly circular holes 12 alternating with high aspect ratio ellipse-like holes.

The transformation is sudden, uniform and robust, resulting in a completely homogeneous pattern switch throughout the structure. Upon unloading, all patterns return to their original state and the transformation repeats itself upon reloading in each case.

The experiments were performed using elastomeric specimens with arrangements of holes cut out of the material. The periodic lattice microstructures were water jet cut from 9.4 mm thick sheets of the photoelastic elastomer PSM-4 (Measurements Group). The first sample (FIG. 1A) comprises a microstructure of a 10 by 10 square array of circular holes of 8.67 mm diameter with 9.97 mm center-to-center spacing, vertically and horizontally, and 5.64 mm from the center of the lateral holes to the edge of the specimen. The second specimen (FIG. 1B) is a rectangular lattice of 12 by 17 elliptical holes of major axes 10.02 mm and minor axis 5.34 mm, with horizontal and vertical center-to-center spacings of 11.02 mm and 5.99 mm, respectively. The third sample (FIG. 1C) comprises a microstructure of a 9.5 by 10 oblique array of circular holes of 8.67 mm diameter with center-to-center spacing of 9.47 mm vertically and 10.97 mm horizontally; the distance between the center of the circular voids of top (bottom) row and the top (bottom) edge is 6.64 mm.

During the experimental tests, the specimens were subjected to axial compression using a Zwick screw-driven machine. The specimens were placed between two 5 mm thick PMMA sheets, which were both lightly dusted with chalk to reduce friction. The sheets are used to restrain out of plane buckling. The specimen and PMMA sheets were then placed in a trough approximately 20 mm wide and 10 mm high in order to secure the set up at the bottom in an upright orientation. The specimens were compressed from the top using an aluminum bar that lay across the width of the specimen, uniformly displacing the top at a rate of 10 mm/min. The load and displacement were monitored and reduced to nominal stress-nominal strain plots. A photograph of the specimen was taken every 0.01 strain, with a Q-Imaging Retiga 1300 camera with a 200 mm lens.

Numerical simulations of the deformation of the different periodic structures were conducted utilizing nonlinear finite element analysis. The elastomeric stress-strain behavior was modeled as a nearly incompressible neo-Hookean solid with a shear modulus of 3.25 MPa. The experimental results suggest that the pattern transformation is a result of a local buckling instability in the compressively loaded vertical inter-hole ligaments in the case of the square arrays and is a result of a shear instability in the diagonally bridging ligaments in the case of the oblique arrays. These instabilities trigger the change to the new configuration. Hence, instability analyses are conducted on all finite sized specimens. To investigate the bifurcations occurring in infinite periodic solids, Bloch wave analyses (Bertoldi et al, submitted to JMPS), a staple of physics long used to examine electronic, photonic and phononic band structures in periodic lattices, have been utilized to predict the microstructural deformation instability mode in periodic structures by applying a Bloch wave perturbation to the unit cell. The stress-strain behavior subsequent to the instability triggered transformation is simulated utilizing information from the instability analysis to perturb the mesh and capture post-instability deformation behavior of the periodic structures. Recognizing that the finite sized specimens are necessarily influenced by boundary conditions at both the loaded and the traction free edges (due to a boundary layer of matrix material), the deformation behavior of infinite periodic arrays are also modeled considering a representative volume element (RVE) of the domain with appropriate periodic boundary.

Figure 2:
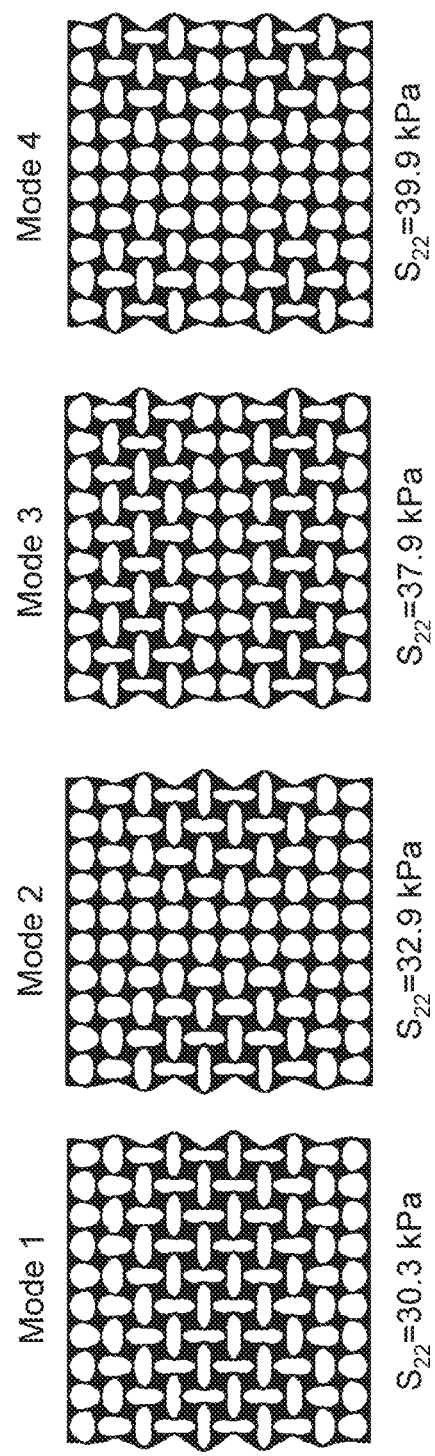
FIG. 2 are the first four eigen modes and values (critical stress) for the finite-size square array of circular voids.

FIG. 2 shows the first four eigen modes for the finite-sized square array of circular voids. The first eigen mode of the finite-sized specimen clearly corresponds to the transformed pattern observed in the compression tests (FIG. 1A). The transformation occurs throughout the specimen with the exception of the rows neighboring the boundary constraint. Modes 2-4 exhibit periodic pockets of the Mode 1 pattern where these modes are clearly the result of interactions between the local instabilities and the boundaries; hence, the critical stress levels for these higher modes are not significantly higher than those of Mode 1. Thus, the eigen analyses further confirm the pattern transformations to be the result of elastic instability events. The modal analyses also suggest the ability to trigger alternative pattern transformations by suppressing the lower modes; for example, a compliant elastic inclusion could act to suppress the Mode 1 pattern and hence favor the Mode 2 pattern of the RVE; alternatively, preferentially placed inclusions could create patterns of alternating transformed and non-transformed domains.

Figure 3:
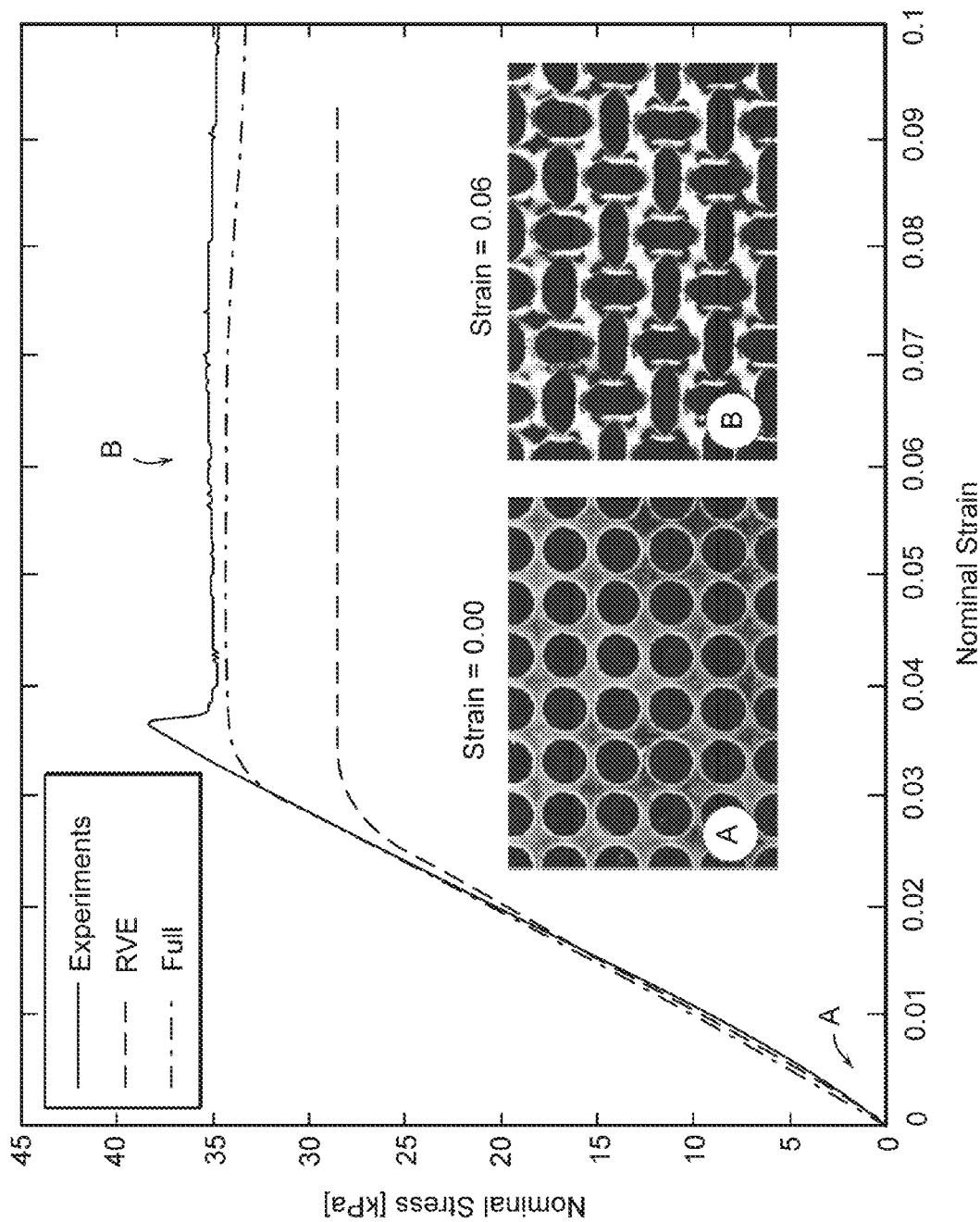
FIG. 3 are nominal stress vs nominal strain curves for the square array of circular voids showing experimental and computational (full model and RVE model) results.
Figure 4:
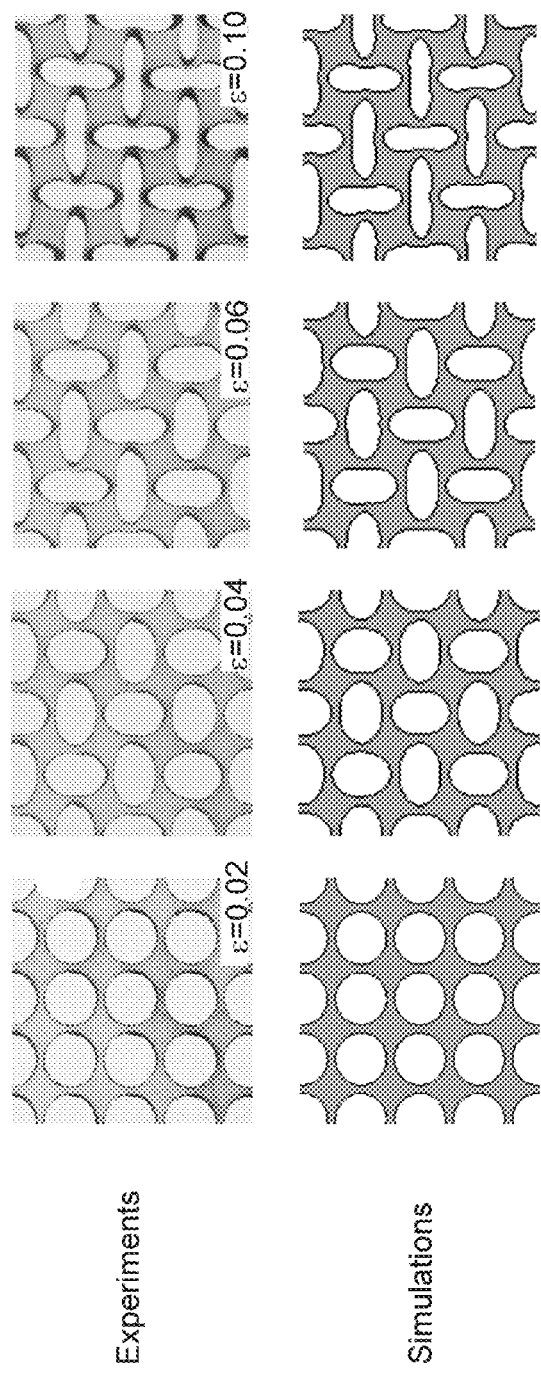
FIG. 4 are experimental (top) and numerical (bottom) images of the square array of circular voids at different levels of macroscopic strain: 2%, 4%, 6%, and 10%.
Figure 5:
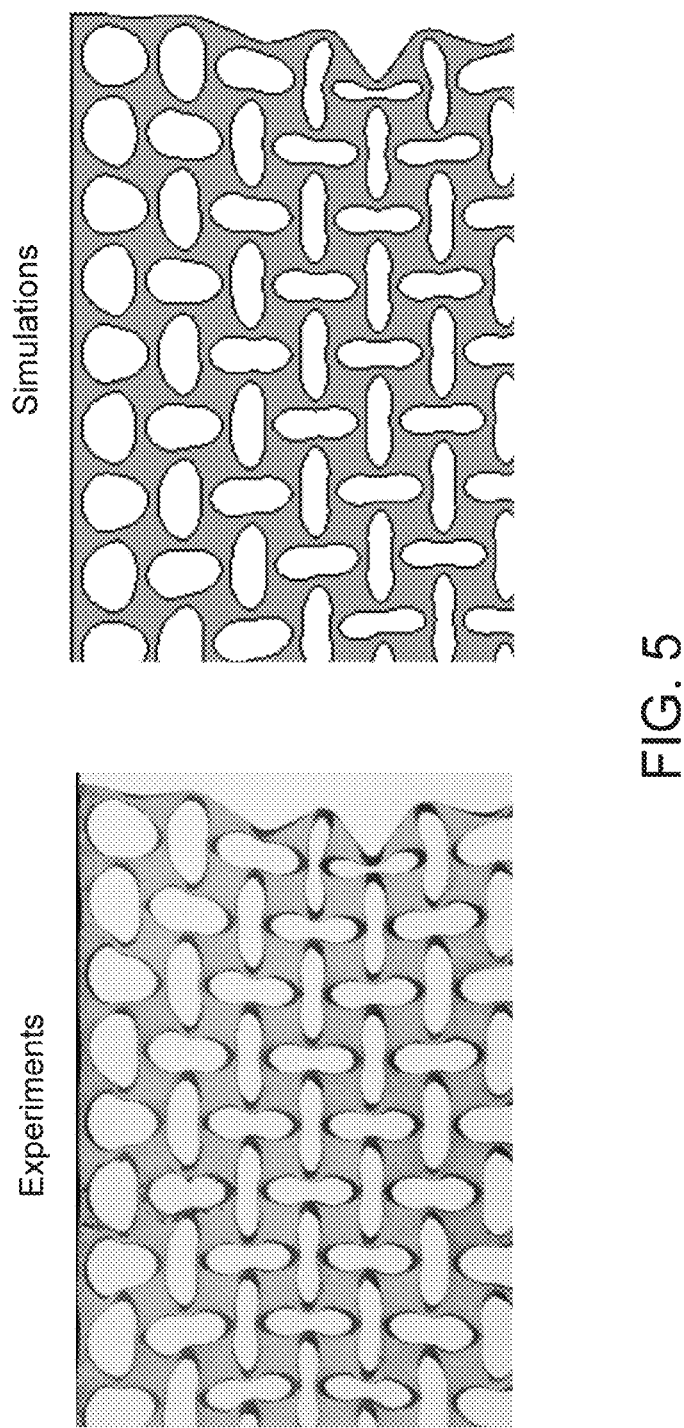
FIG. 5 are experimental (left) and numerical (right) images of the square array of circular voids at a strain of 0.10.

Post-transformation analyses were conducted by introducing a geometrical imperfection with the form of the first eigen mode to preferentially activate the first mode during simulation of the compression test of both the finite-sized specimen and its infinite counterpart. FIG. 3 shows that excellent quantitative agreement is obtained between the stress-strain results of the finite-sized model calculation and those from the experiments. The infinite periodic solid results exhibit an earlier departure from linearity than those from the finite-sized model since the former do not capture the influence of the boundary conditions. There is excellent agreement between the model predictions and the experimental images of the pattern evolutions with strain as shown in FIG. 4. The homogeneous compression of the circular array during the linear regime of the stress-strain behavior, the pattern transformation at the critical stress, and the accentuation of the new alternating elliptical pattern with ongoing strain are all captured. For completeness, a nearly full view (the top and bottom row of the experiment are obscured by the test fixtures) of the full specimen and the corresponding simulation at a strain of 0.10 are shown in FIG. 5 again demonstrating excellent agreement between simulation and experimental results.

Figure 6:
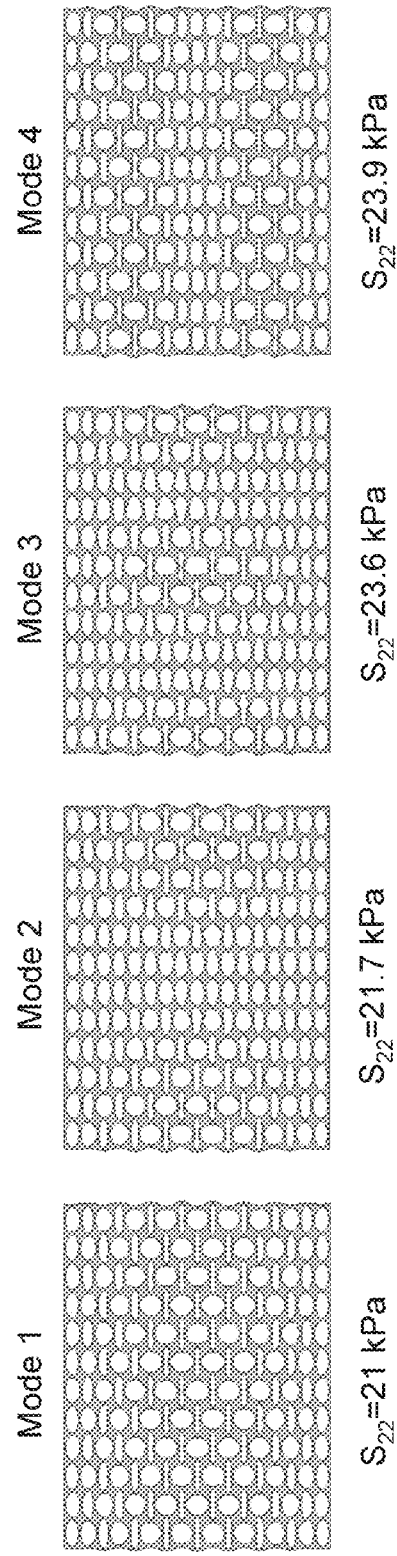
FIG. 6 are the first four eigen modes and values (critical stress) for the finite-size rectangular array of elliptical voids compressed in the direction perpendicular to the ellipses' major axes.
Figure 7:
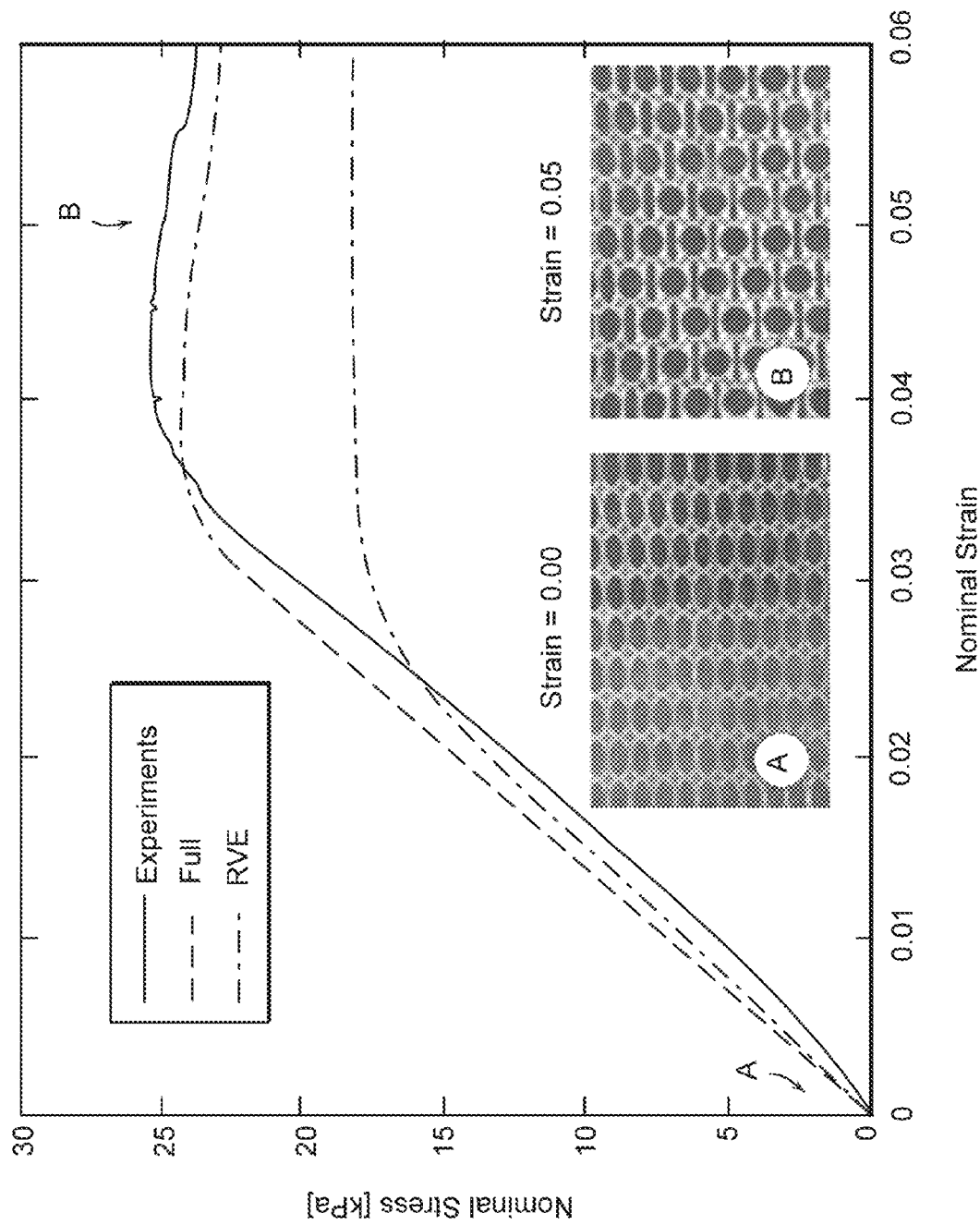
FIG. 7 are experimental and numerical results for the nominal stress-nominal strain behavior of the rectangular latticed structure of elliptical holes.
Figure 8:
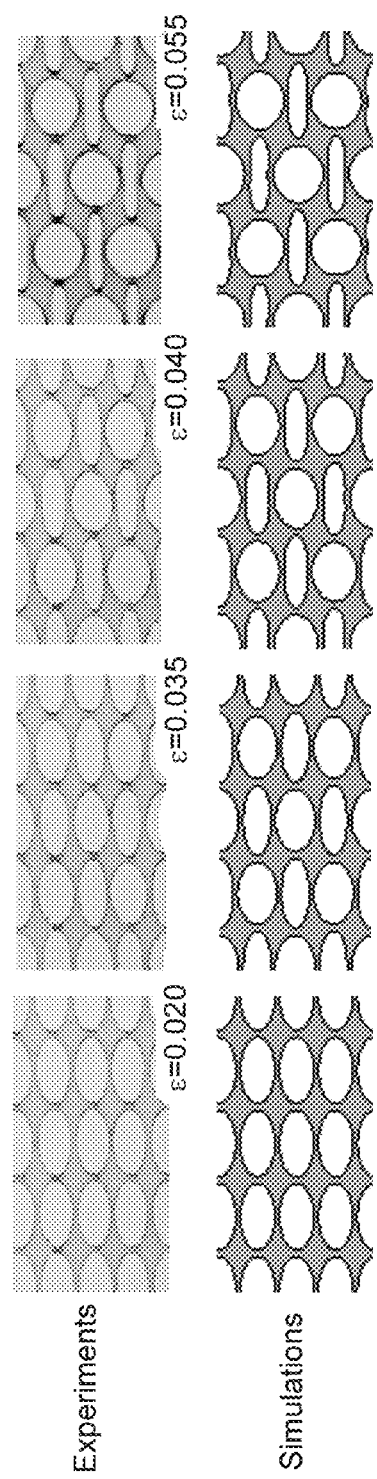
FIG. 8 are experimental (top) and numerical (bottom) images of the rectangular lattice of elliptical holes compressed in the direction perpendicular to the major axis at different levels of macroscopic strain: 2%, 3.5%, 4%, and 5.5%.

Also for the rectangular array of elliptical voids, following the approach used for the analysis of the square array of circular holes, instability analyses of both the finite-sized specimen and its infinite counterpart have been performed. The first four eigen modes of the finite-sized specimen are shown in FIG. 6 for compression perpendicular to the major axis. Similar to the case of the square array of circular holes, the higher modes of the finite-sized specimen contain pockets of the Mode 1 pattern and the corresponding critical stress levels are close to that of Mode 1. An imperfection in the form of the first eigen mode was placed in the mesh to preferentially activate the first mode during the compression test on both the finite-sized specimen and RVE models containing 2×2 primitive cells. FIG. 7 shows excellent agreement between the finite-sized model predictions and the experimental results, whereas FIG. 8 shows excellent agreement between the model predictions and the experimental images of the pattern evolutions with strain.

Figure 9:
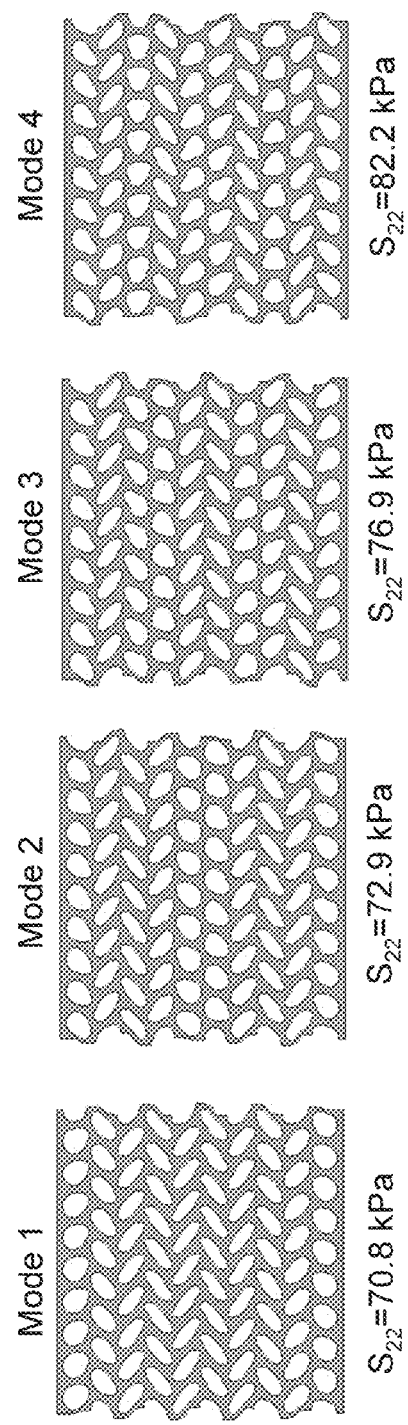
FIG. 9 are the first four eigen modes and values (critical stress) for the finite-size oblique array of circular holes.
Figure 10:
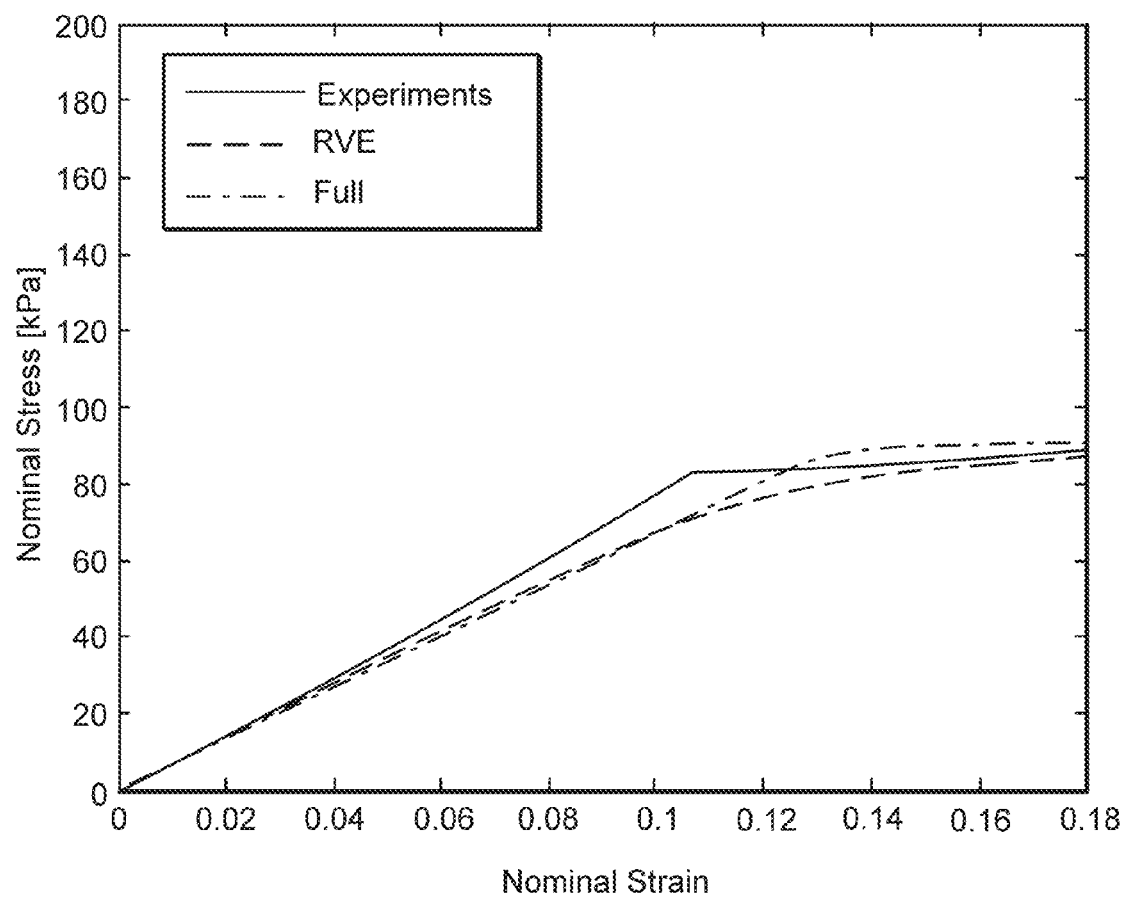
FIG. 10 are experimental and numerical results for the nominal stress-nominal strain behavior of the oblique latticed structure of circular holes.
Figure 11:
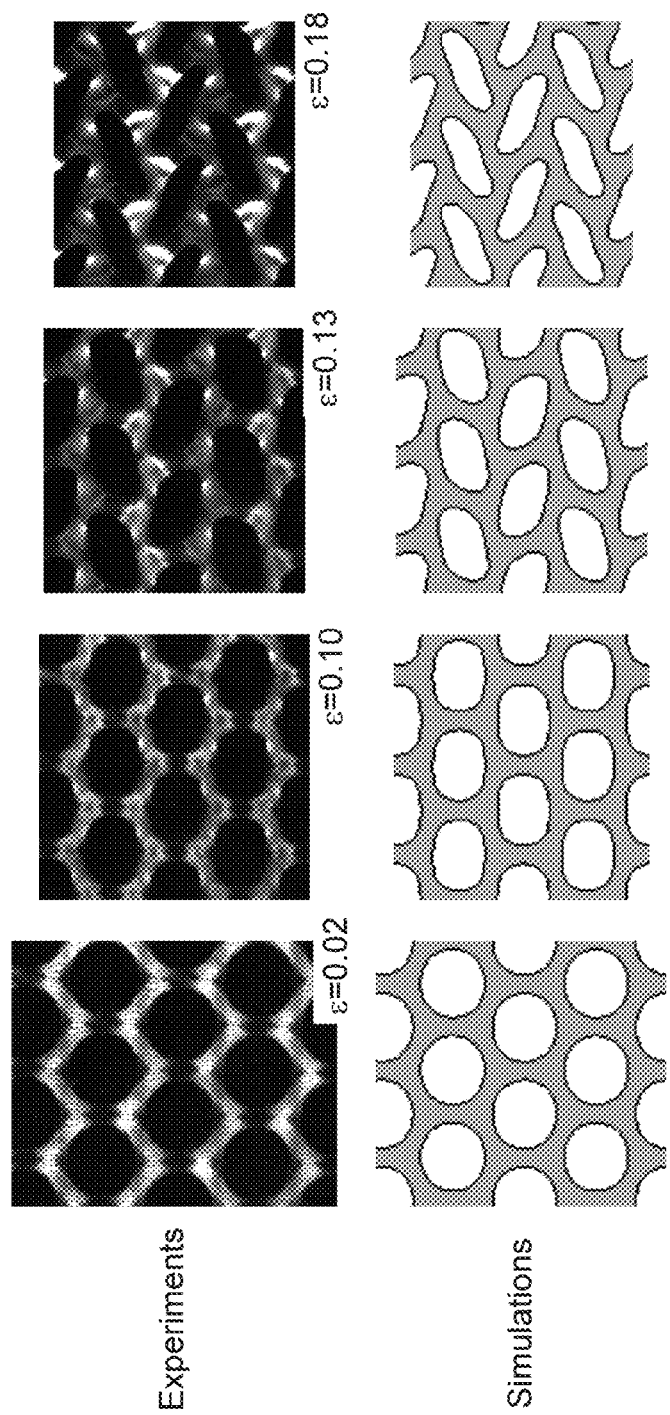
FIG. 11 are experimental (top) and numerical (bottom) images of the oblique lattice of circular holes at different levels of macroscopic strain: 2%, 10%, 13%, and 18%.

Following the approach used for the analysis of the square array of circular voids and the rectangular array of elliptical voids, eigen analyses of the finite-sized specimen and enlarged RVEs have been performed for the oblique array of circular voids. FIG. 9 shows the first four eigen modes of the finite-sized specimen. The first mode clearly captures the experimentally observed transformed pattern. The higher modes of the finite-sized specimen contain rows of the Mode 1 pattern. The edges of the oblique array specimens are sliced through the voids and hence there is not an edge boundary layer of solid giving a lateral constraint on any instability. An imperfection in the form of the first eigen mode was introduced into the mesh to activate the first mode during simulation of the compression test. FIG. 10 provides a direct comparison between the numerical and experimental stress-strain results, showing excellent agreement between the model predictions and the experimental results. The 1×2 enlarged RVE exhibits a response almost equal to that characterizing the finite-sized model, since the lateral boundaries are not influencing the behavior of the finite-sized specimen. Finally, FIG. 11 shows the comparison between the model predictions and the experimental images of the pattern evolutions with strain and excellent agreement is found between model predictions and experimental results.

Figure 12:
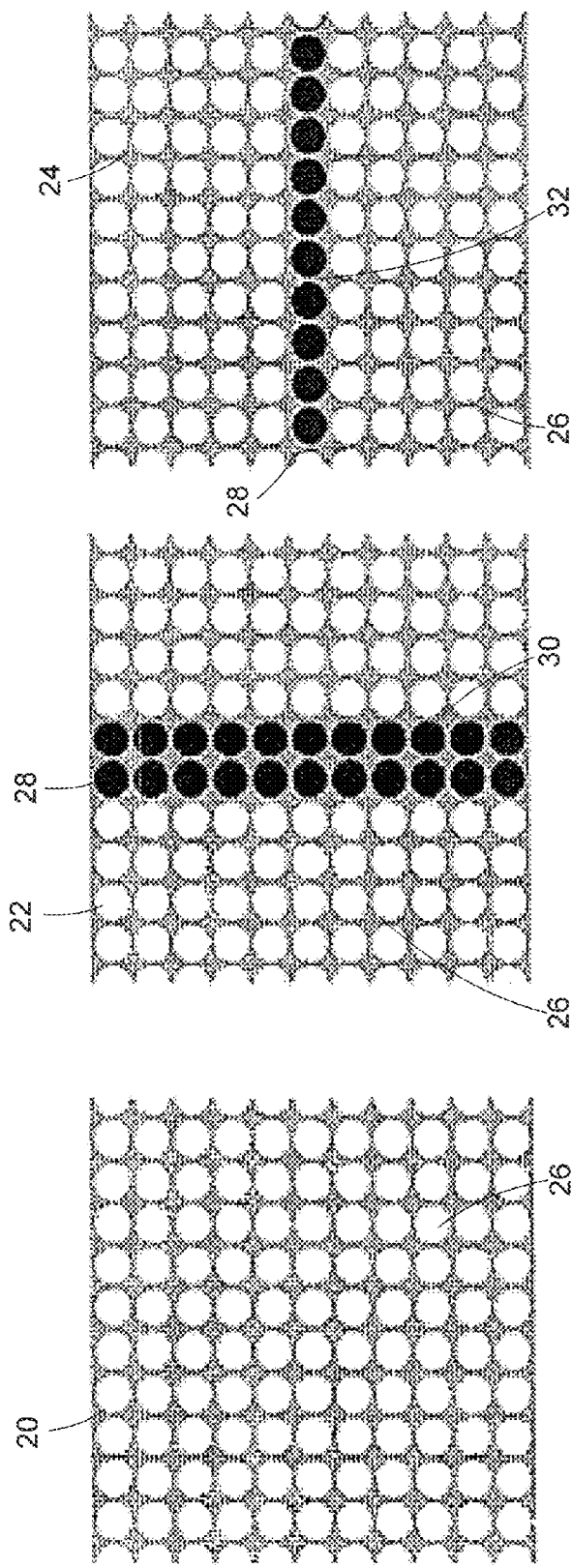
FIG. 12 are schematics of the specimens that have been tested: specimen geometry (left), the same specimen with a vertical segment of filled holes (center) and a horizontal segment of filled holes (right)

During the experimental tests the first eigen mode is observed since it requires the lowest load to initiate buckling. However, the higher modes can be produced by suppressing the first mode and to further control the pattern transformation in periodic structures using selective placement of inclusions in the cells. The location of the inclusions can dictate which mode will be favored. A square lattice of circular holes is chosen as our exemplar. Inclusions in the form of cotton balls were then introduced into some of the holes in the specimen. The density of the cotton inclusions 28 was kept approximately the same. The inclusions 28 were added in different patterns in order to examine the ability to induce different pattern transformations; the two patterns 30, 32 are shown in FIG. 12.

Figure 13:
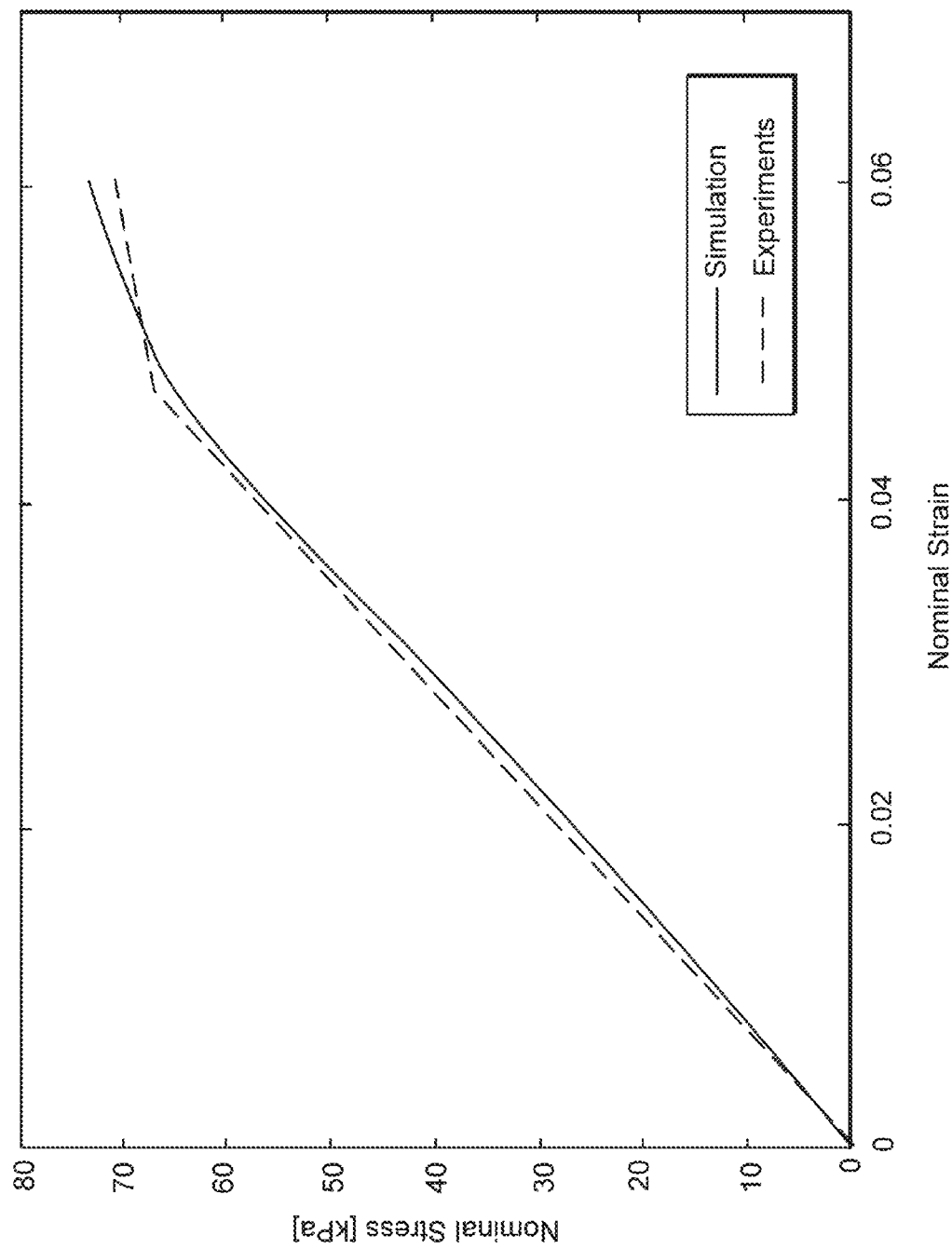
FIG. 13 are experimental and simulation results for nominal stress versus nominal strain of the square lattice with central columns of vertical inclusions.
Figure 14:
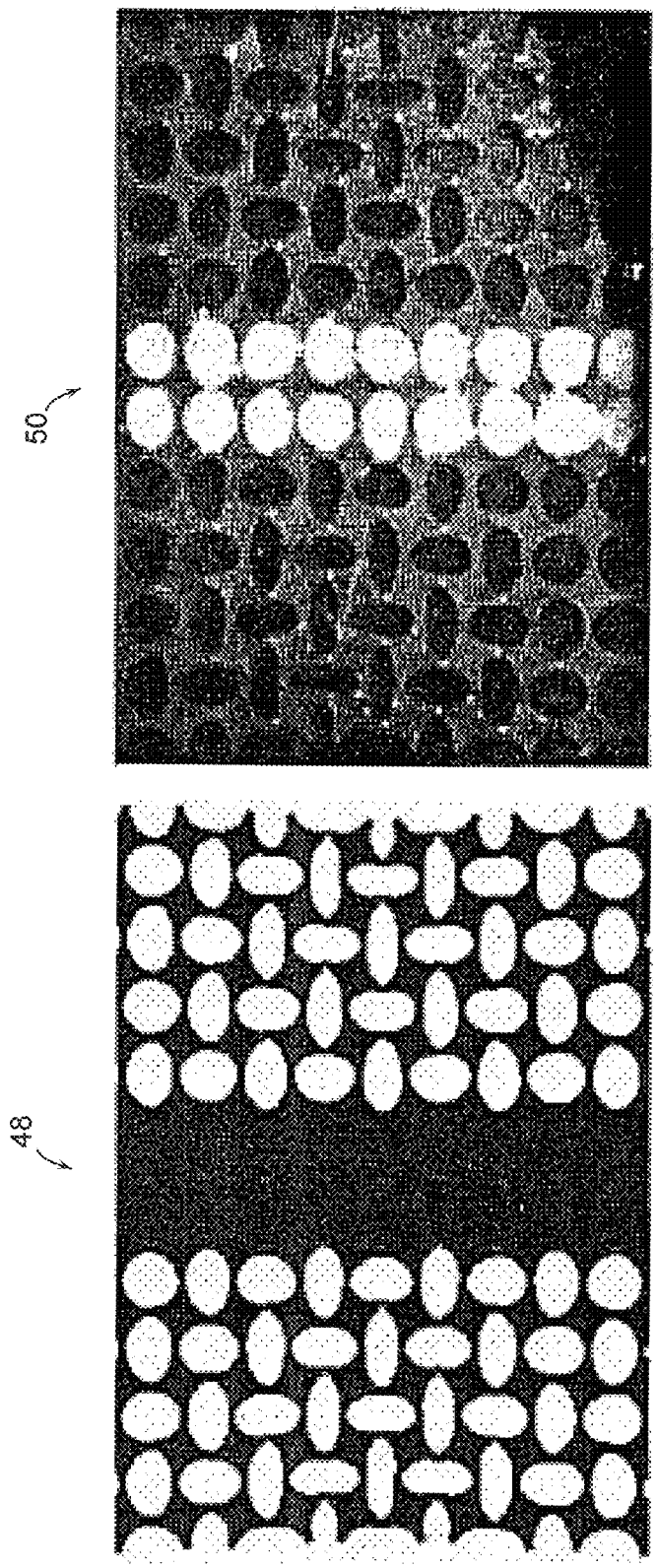
FIG. 14 are simulation (left) and experimental (right) deformed images of lattice with central columns of inclusions.

In order to suppress mode one and encourage mode two and mode three patterns, inclusions are respectively placed in the structure in a vertical column and a horizontal row. For the case of the vertical column of inclusions, the experimental and numerical results for the nominal stress versus nominal strain are shown in FIG. 13 with corresponding deformed images 48, 50 at a strain of 0.06 shown in FIG. 14. At lower strains the material shows linear elastic behavior. The inclusions suppress the transformation in the central region and the pattern is seen to transform to the side triangular patterned region seen for mode 2; the transformation occurs after reaching a critical nominal stress slightly higher than that observed earlier for the base square array. After the critical buckling condition is reached, the behavior exhibits a well-defined stiffness instead of a plateau. This stiffness is derives from the two columns of inclusions which are still being compressed. After the pattern change is triggered, all of the increase in stress is a result of the compression of the inclusion domains, where the transformed voided region is now in its load plateau response and no longer contributes to the specimen stiffness. These results demonstrate an ability to pattern the transforming regions.

Figure 15:
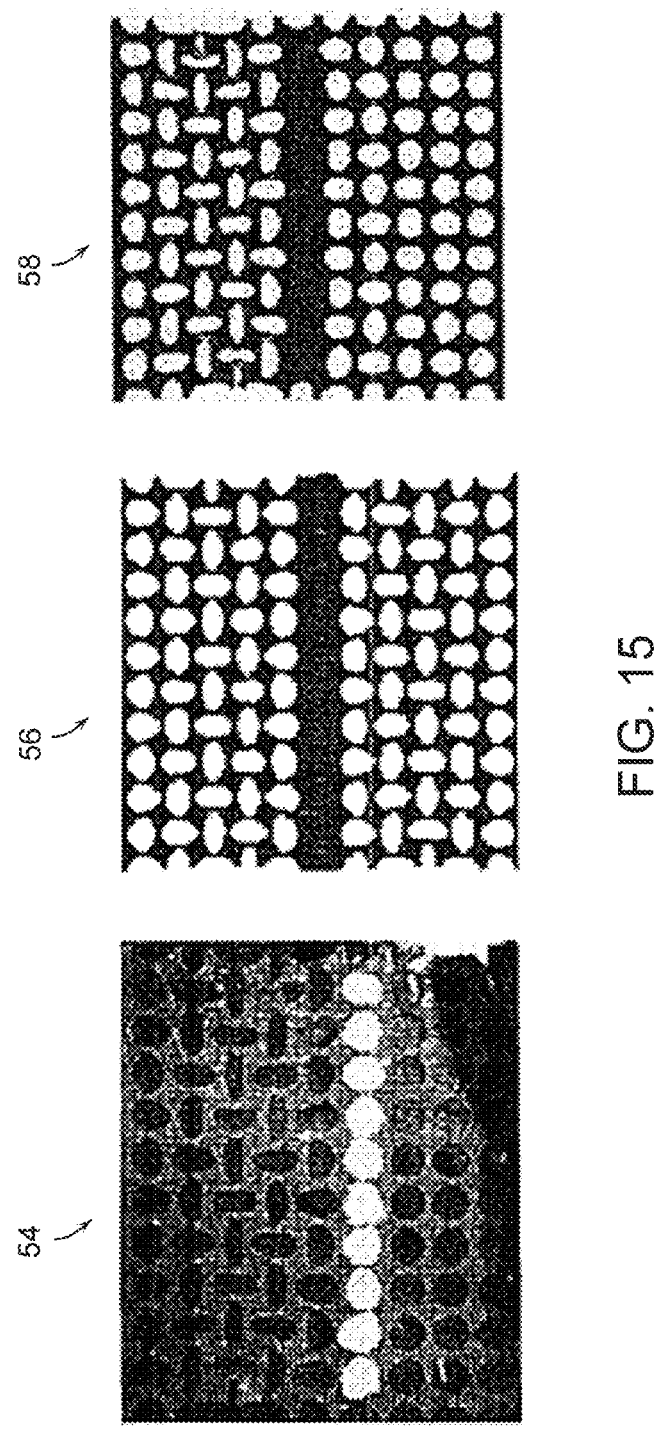
FIG. 15 demonstrates graphs illustrating experimental and simulation results at 6% nominal strain after the pattern transformation has been triggered and accentuated.

FIG. 15 shows deformed images 54, 56, 58 after a strain of 0.06 for the case where inclusions were placed in a central horizontal row. The horizontal row of inclusions is seen to suppress the pattern transformation in both the inclusion row and the region below that row; the region above the row of inclusions in seen to transform. This again demonstrates the ability to pattern the pattern transformation regions. The inclusions were placed in the very central row creating, in theory, a symmetric structure; however, the structure itself combined with the gripping and loading conditions provide some asymmetry. This asymmetry favored the pattern transformation of the top region as opposed to having the transformation occur in both the top and bottom regions. The simulation result for the perfectly symmetric structure and loading conditions is shown in the center image 56 of FIG. 15 and exhibits transformed regions on both the top and bottom halves. This result emulates Mode 3 of the square array. Placing a greater imperfection bias in the top region than in the bottom region favors transformation of the top half as shown in the right image 58 of FIG. 15.

Figure 16:
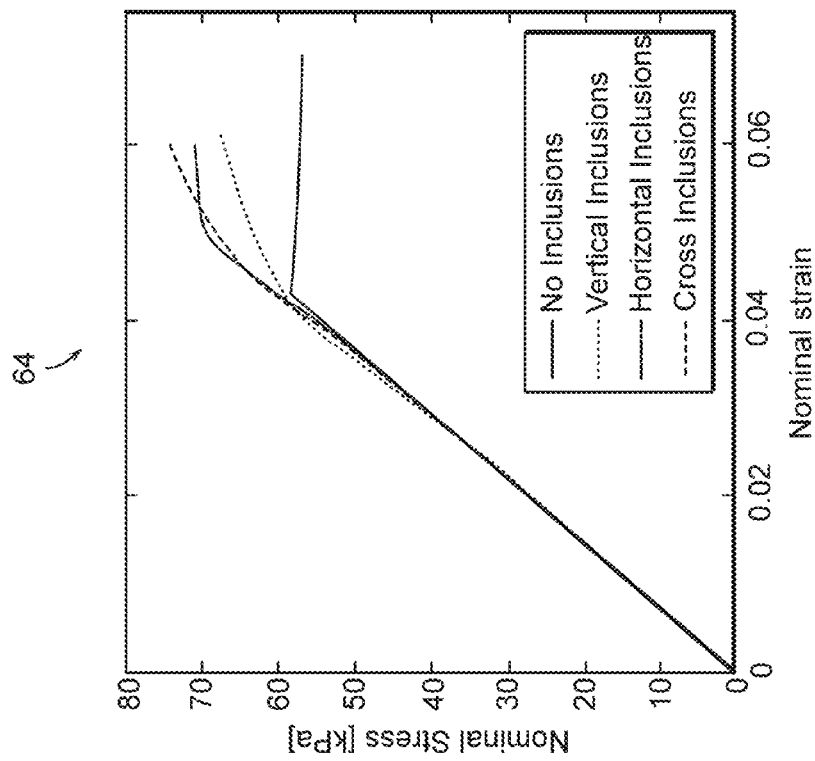
FIG. 16 are nominal stress versus nominal Strain, experimental (left) and simulation (right) Results, for the various cases.
Figure 16:
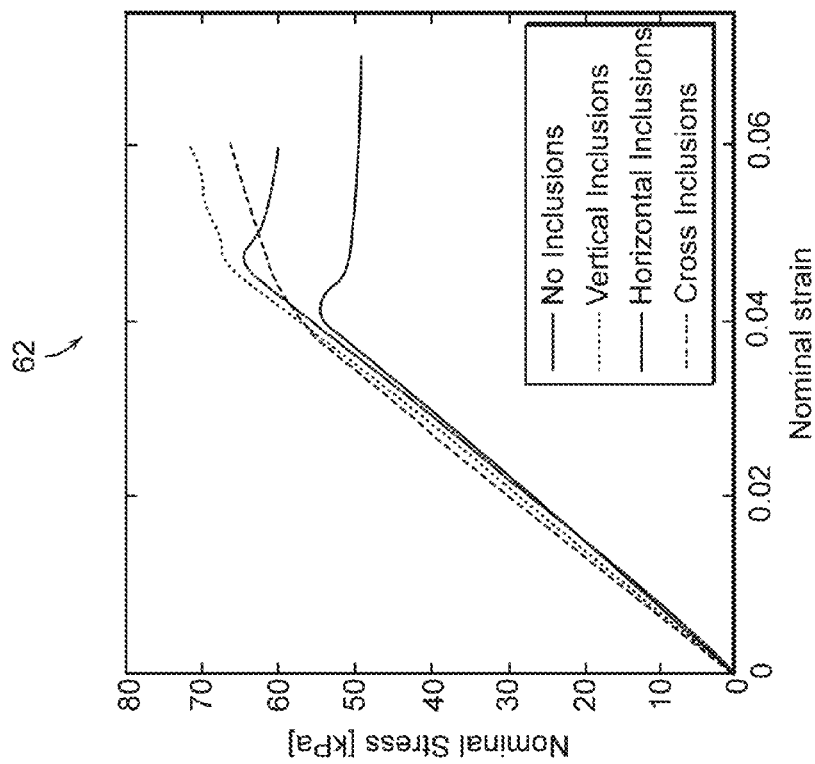
Figure 18A:
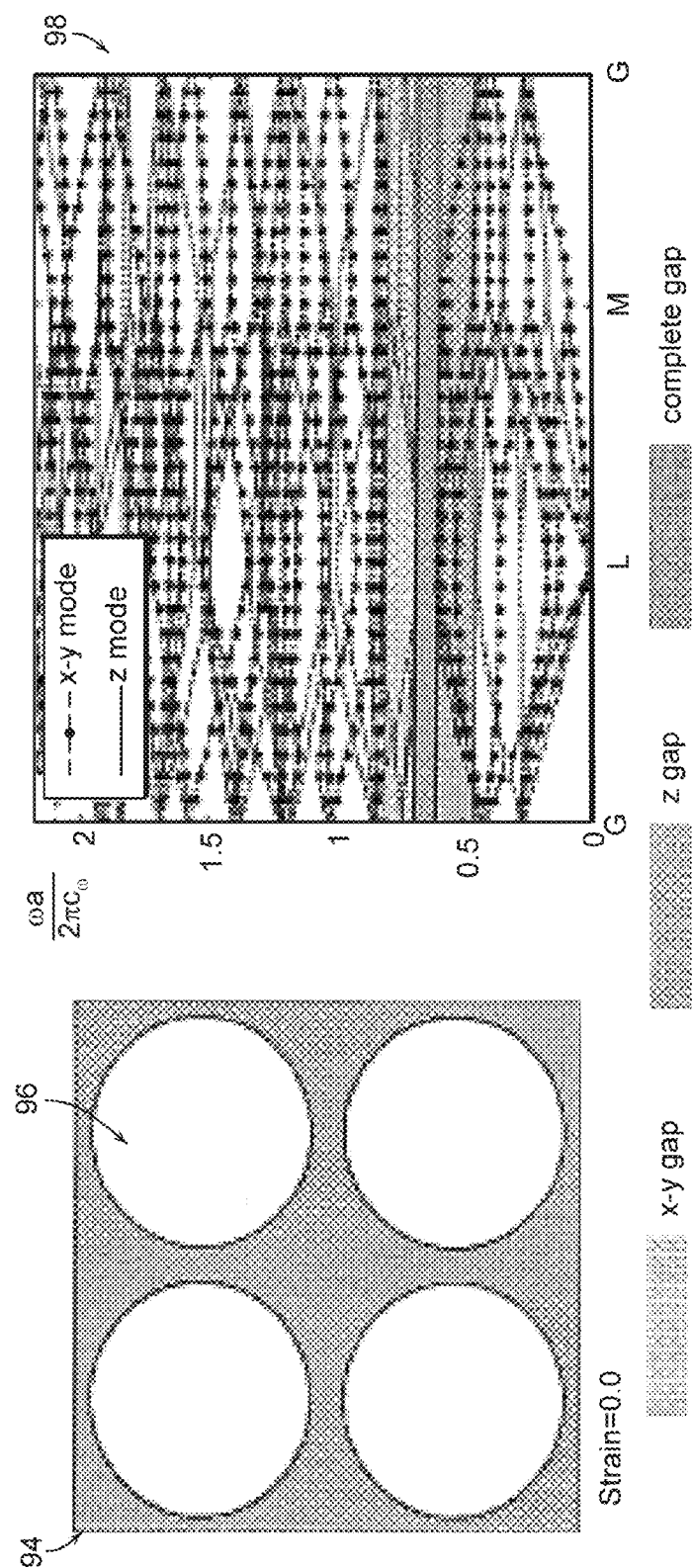
FIG. 18 are phononic band gap structure for the square array of circular holes at different levels of macroscopic strain in the elastomeric matrix.
Figure 18B:
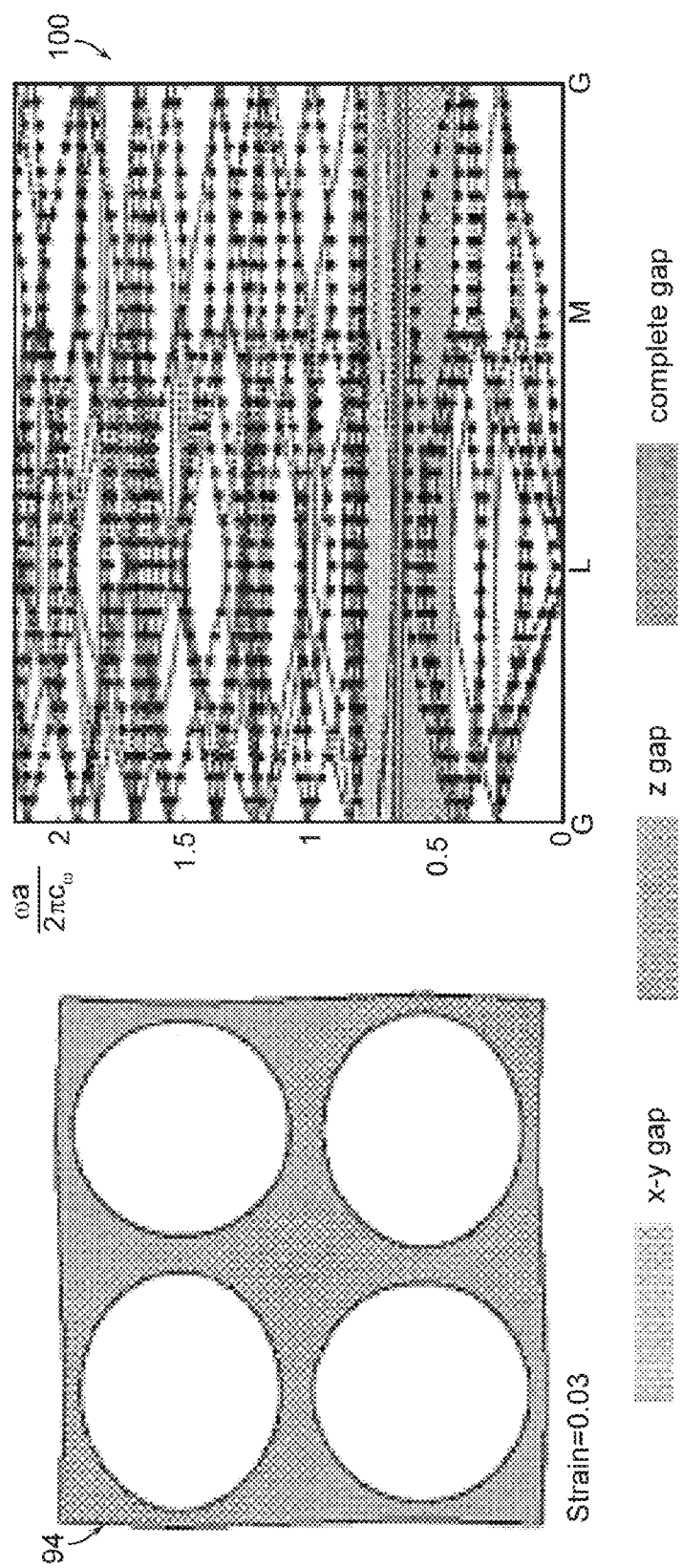
Figure 18C:
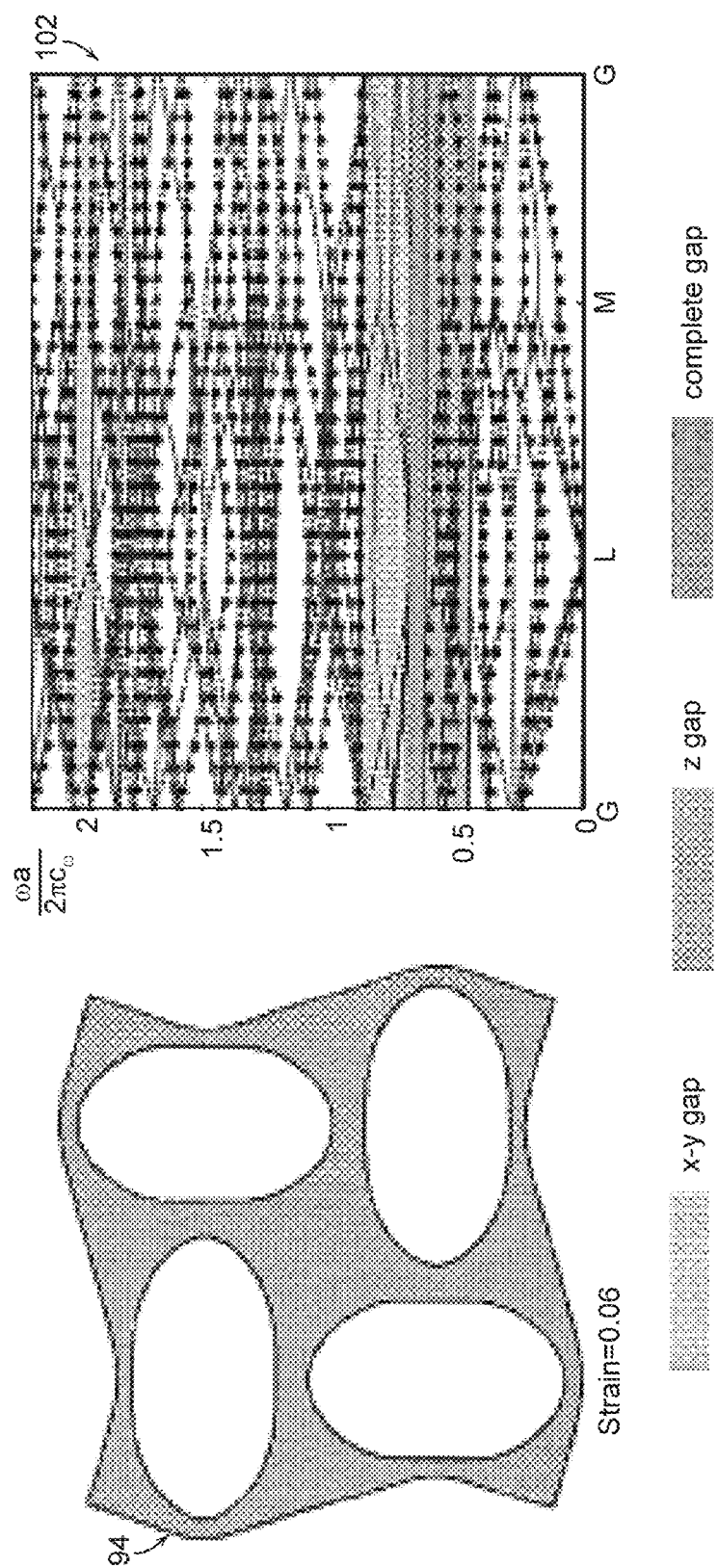
Figure 18D:
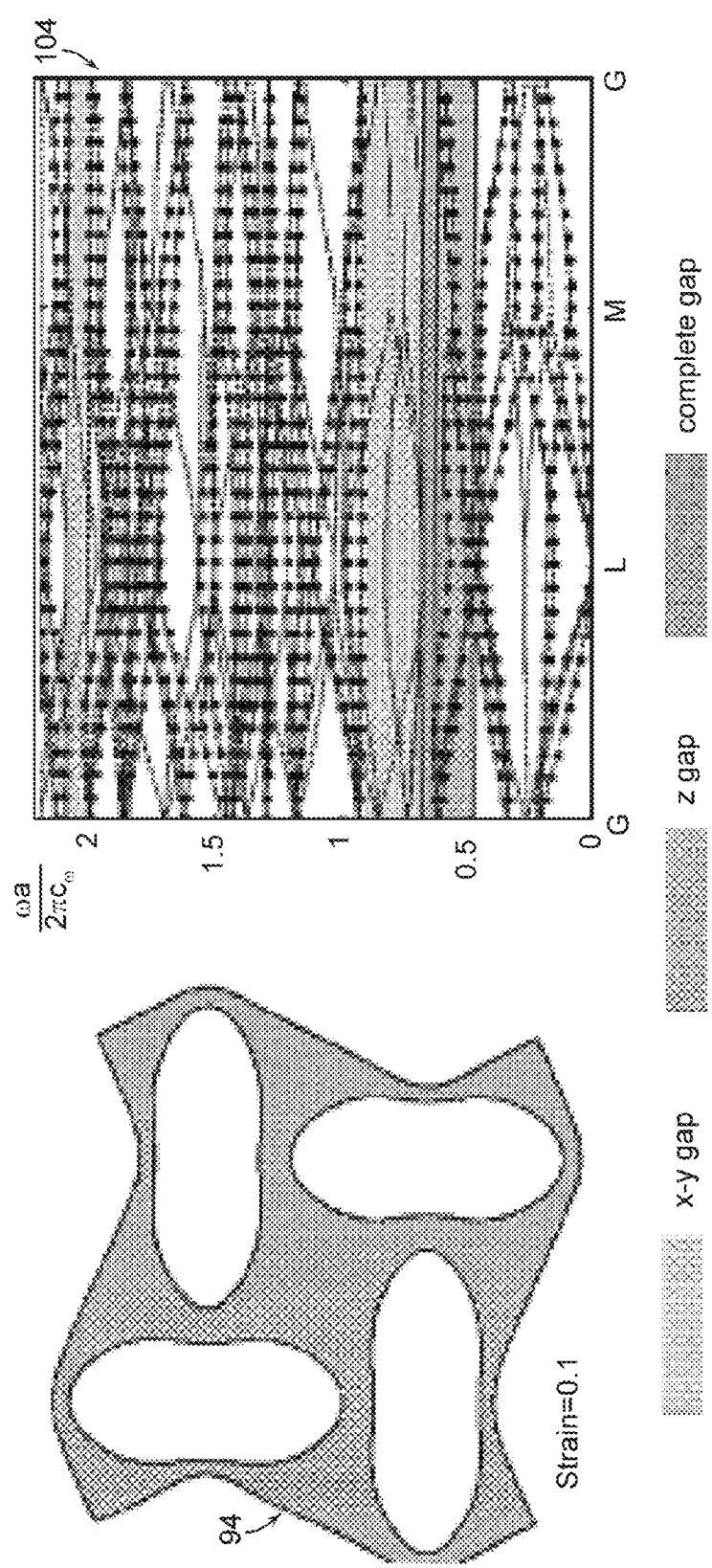

Experimental 62 and numerical 64 results for the nominal stress-strain behavior of the various cases are shown in FIG. 16. The excellent quantitative agreement between experiment 62 and simulation 64 as well as the ability of the simulation to capture all trends in stress-strain behavior and underlying pattern transformations further illustrate the ability to use simulation to predict (and hence try out) the use of different inclusion patterns and properties to tailor pattern transformation in periodic structures. The results seen indicate the ability to create a lattice that is tuned to have pattern transformations that can be predicted by controlling the parameters of both the lattice and the inclusions. Further investigation into different arrays of inclusions could lead to many more instances of new, predictable patterns. These structures and transformation phenomena are also clearly extendable to three-dimensional periodic structures.

Furthermore, we demonstrate through modeling that these mechanically triggered pattern transformations can be further exploited to transform the character of the phononic band gap structure of the material, opening up new avenues of tailoring and control in acoustic design. Phononic band gap materials prevent the propagation of elastic waves in certain frequency ranges. Phononic crystals are periodic elastic structures which exhibit a range in frequency where elastic wave propagation is barred. The ability to design structures which exhibit such phononic band gaps (PBGs) has been of growing interest in recent years due to the enormity of their potential as sound filters, acoustic mirrors, acoustic wave guides, and in transducer design. Typical structures take the form of two-dimensional (2D) or three-dimensional (3D) arrays of inclusions of one (or more) material(s) in a matrix with contrasting properties. The position and width of the PBGs can be tailored by the selection of (i) constituent materials with contrasting densities and contrasting speeds of sound, (ii) lattice topology (for example, square vs rectangular vs oblique arrays), (iii) lattice spacing, and (iv) volume fraction of inclusions. Many solid-solid, solid-fluid and solid-air structures have been pursued through experiments and/or simulation.

Here, for the first time, the potential for periodic elastomeric materials to serve as transformative PBG materials is pursued. 2D periodic elastomeric structures have been shown to undergo dramatic mechanically-triggered transformations in their periodic pattern. It is demonstrated through modeling that these mechanically triggered pattern transformations can be further exploited to transform the character of the PBG structure of the material, opening up new avenues of tailoring and control in acoustic design. The mechanically-triggered transformative character of the PBGs in periodic elastomeric structures is examined by studying two representative 2D infinitely periodic structures: a square array of circular holes 80 of radius r=4.335 mm in an elastomeric matrix with center-to-center spacing $a_x=a_y=9.97$ mm, so that the initial void volume fraction is $f_0=0.59$, as shown in FIG. 11A, and an oblique array of circular holes 82 of radius r=4.335 mm with center-to-center spacing $a_y$=9.47 mm vertically and $a_x$=10.97 mm horizontally, as shown in FIG. 11B, with an initial void volume fraction $f_0$=0.57.

The elastomer density is 1050 kg/m$^3$ so that the transverse and longitudinal speeds of sound for the undeformed material are $c_{t0}$=32.2 m/s and $c_{l0}$=236.5 m/s. When the periodic elastomeric structure is subjected to axial compression, a dramatic pattern transformation is observed to occur and it has been shown in that the pattern transformations for the infinite periodic structures are a result of an elastic instability in the cell microstructure. The bifurcation introduces a periodic cell larger than the primitive cell of the lattice. Thus, in correspondence with the periodicity of the transformed patterns, representative volume elements (RVEs) consisting of 2×2 and 1×2 primitive cells 84, 86 are considered for the square and oblique array of circular holes 80, 82 with their respective reciprocal lattices 88, 90, respectively, as shown in FIGS. 17A-17B.

The nonlinear finite element code ABAQUS was used to deform or transform the structures as well as to obtain the dispersion diagrams. A 3D mesh of each RVE was constructed using 15-node hybrid wedge elements (only one layer of elements is used in the z-direction). The RVE is subjected to macroscopic axial compression. The deformation is applied to the surface of the RVE through a series of constraint equations which provide general periodic boundary conditions and respect the infinite periodicity of the structure.

The propagation of elastic waves through each structure is analyzed at different levels of macroscopic strain. The finite element method is also used to compute the band structure. This necessitates conducting a Bloch wave analysis within the finite element framework. In order to work with the complex valued displacements of the Bloch wave calculation within the confines of a commercial code, all fields are split into real and imaginary parts. In this way the equilibrium equations split into two sets of uncoupled equations for the real and imaginary parts. Thus the problem is solved using two identical finite element meshes for the RVE, one for the real part and one for the imaginary part and coupling them by Bloch-type displacement boundary conditions. In this way eigenfrequencies $\omega$ can be computed for any wave vector ko. Here the wave propagation is limited to the x-y plane perpendicular to the holes ($k_{oz}$=0), so that a decoupling between the out-of plane (z) and in-plane (x-y) wave polarizations is obtained.

The band diagrams 98, 100, 102, 104 for the case of the square array of circular holes 96 are provided at different levels of macroscopic nominal strain (0.0, 0.03, 0.06, and 0.1) shown in FIG. 18. Both in-plane (x-y) and out-of-plane (z) modes are shown together with the evolving structure. The transformation of the band gaps 110 with deformation is reported in FIG. 19. In the undeformed configuration, the periodic structure possesses an in-plane (x-y) phononic band gap 108 or normalized frequencies of $\omega a/(2\pi c_{t0})$=0.61–0.82 (with a=$(a_x+a_y)/2$) and an intersecting out-of-plane (z) gap for normalized frequencies of 0.45-0.68, yielding a complete phononic band gap for normalized elastic frequencies of 0.61-0.68.

Figure 19:
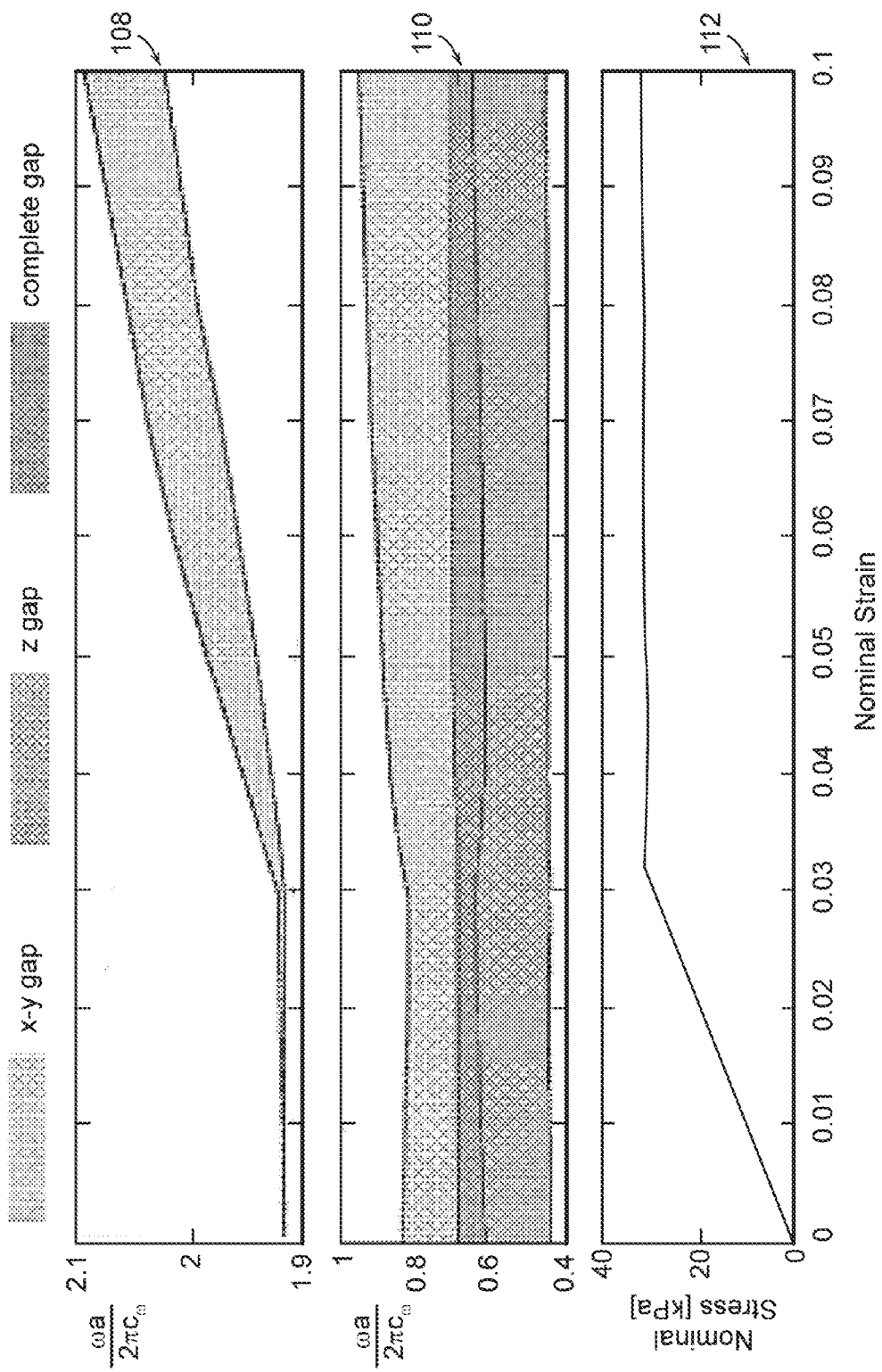
FIG. 19 are phononic band gap (top and center) and nominal stress (bottom) vs nominal strain for the square array of circular holes.

During the initial linear elastic response of the periodic structure, the circular holes 96 are observed to undergo a gradual and homogeneous compression FIG. 4. At this stage the band gaps are affected marginally by the deformation, evolving in an affine and monotonic manner as shown in FIG. 19. This relatively affine-like behavior is replaced by a transformation to a pattern of alternating, mutually orthogonal ellipses above a nominal strain of 0.032. The in-plane (x-y) modes undergo a transformation as well, while the out-of-plane (z) modes are observed to be only marginally affected by the pattern transformation. A new in-plane (x-y) band gap is opened at a normalized frequency of 2 and the pre-existing gap flow begins to widen.

Figure 20B:
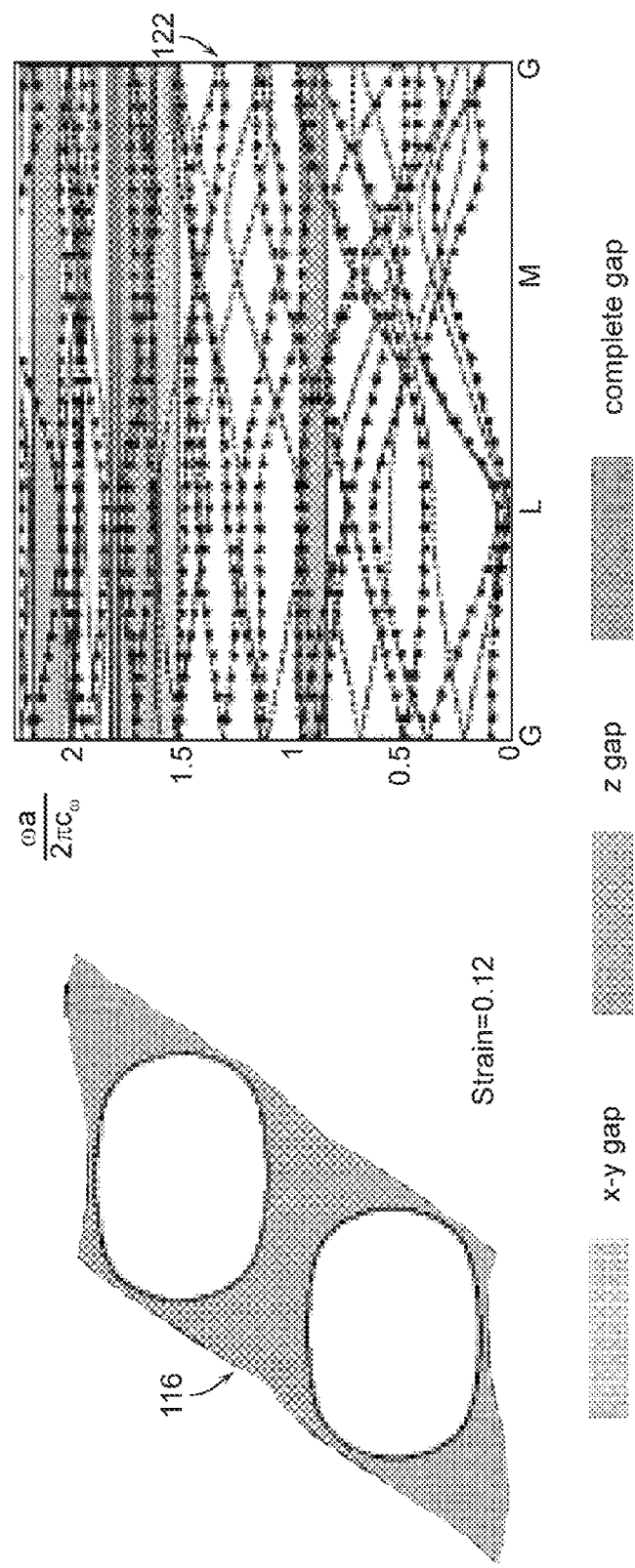
FIG. 20 are phononic band gap structure for the oblique array of circular holes at different levels of macroscopic strain in the elastomeric matrix.
Figure 20C:
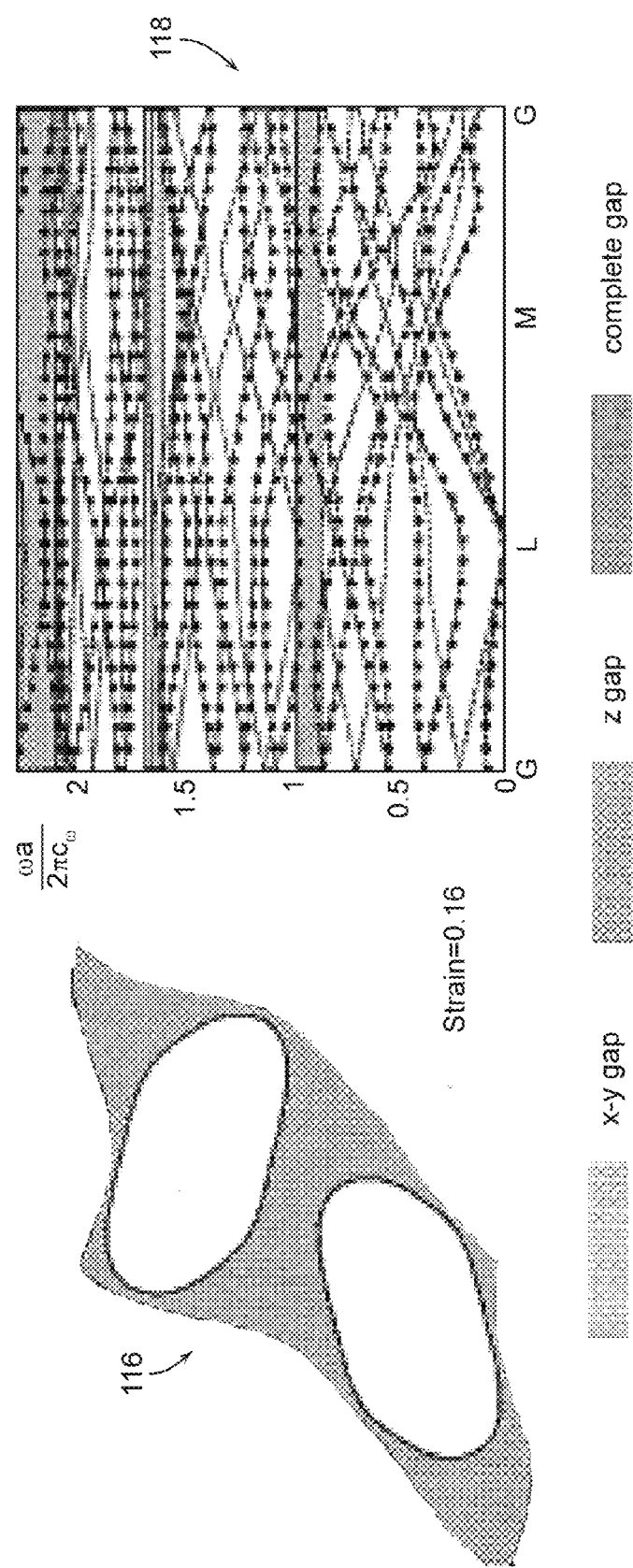
Figure 20D:
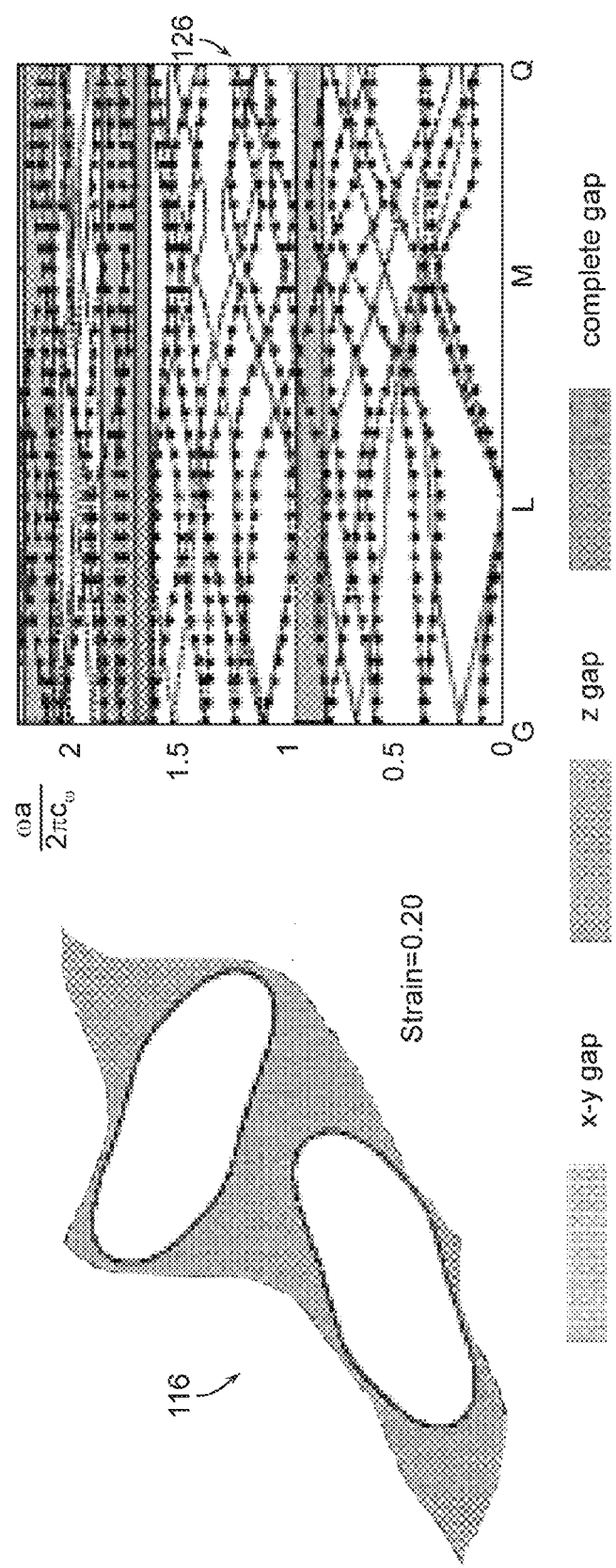
Figure 21:
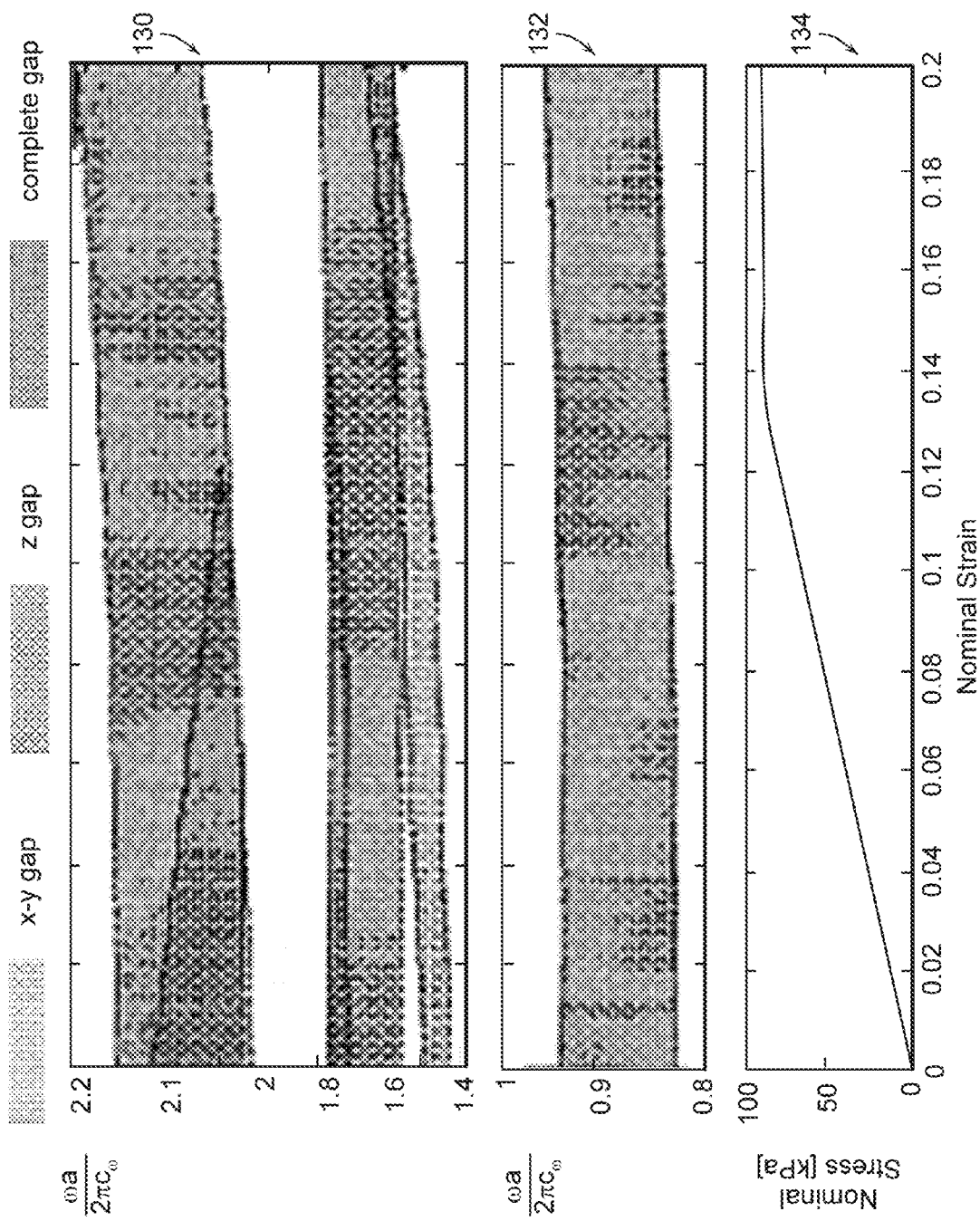
FIG. 21 are phononic band gap (top and center) and nominal stress (bottom) vs nominal strain for the oblique array of circular holes.

The band diagrams for the case of the oblique array of circular holes are shown in FIG. 20 for both the in-plane (x-y) and out-of-plane (z) modes at different levels of macroscopic nominal strain. The transformation of the band gaps with deformation is reported in FIG. 21. The undeformed configuration of the periodic structure possesses three separate out-of-plane (z) band gaps. As in the case for the square array, these band gaps are only marginally affected by the pattern transformation. The undeformed structure exhibits three separate in-plane (x-y) band gaps. The width of the lowest frequency gap is not strongly affected by the deformation and transformation, but at a strain of 0.13 it intersects the z-mode yielding a complete band gap. The width of the second and the third gaps are observed to reduce progressively with increasing deformation until a strain of 0.125 whereupon the pattern transformation yields their complete closure. As in the case for the square array, these band gaps 120-126 are only marginally affected by the pattern transformation. The undeformed structure exhibits three separate in-plane (x-y) band gaps for normalized frequencies of 1.45-1.52, 1.75-1.85 and 2.05-2.12. The lowest frequency gap is not strongly affected by the deformation and transformation. The width of the second and the third gaps are observed to reduce progressively with increasing deformation until a strain of 0.125 whereupon the pattern transformation yields their complete closure.

Therefore, the invention provides the ability to transform phononic band gaps in elastomeric periodic solids using the simple application of a load or a deformation.

The invention allows one to transform phononic band gaps in elastomeric periodic solids using the simple application of a load or a deformation. Periodic elastomeric structures have been shown to be characterized by an initial affine-like deformation, followed by a homogeneous pattern transformation upon reaching a critical value of applied load. It has been shown that the phononic band structure evolves in a monotonic manner during the linear region of nominal stress-strain behavior when the deformation of the inherent structure pattern is relatively affine. When the periodic pattern transforms to a new pattern upon reaching the critical load, the evolution in the phononic band gap also changes in a non-affine manner. For the particular geometry and properties studied here, the band gaps exhibited by the materials are in the audible range.

The location and presence of the gaps as well as their transformation can be further tuned by varying the geometric properties of the periodic structures as well selecting different material properties. The transformations can be further manipulated applying different types of loading and would also extend to three-dimensional periodic structures. In these ways the band gaps and their transformations can be tuned not only for the audible range, but also other frequency domains of interest. Furthermore, the mechanically triggered pattern transformation phenomena can be utilized in photonic applications using appropriate materials and pattern length scales. The invention can be applied on a millimeter-length scale, but the effects should persist at the micro- and nano-scale. At these smaller scales, the transformations could lead to applications in photonic crystals and the structures could have the ability to manipulate light. The many different manners in which the pattern change can be controlled indicate that a highly detailed level of control of the light and specific functions may be achieved.

Although the present invention has been shown and described with respect to several preferred embodiments thereof, various changes, omissions and additions to the form and detail thereof, may be made therein, without departing from the spirit and scope of the invention.

What is claimed is:

1. A transformative periodic structure comprising a plurality of polymeric periodic solids having a plurality of ligaments being coupled to a periodic array of similarly sized circular or elliptical holes defining a geometric pattern that experiences a transformation in the structural configuration upon application of a critical macroscopic stress or strain, said transformation alters the geometric pattern changing the spacing and the shape of the features within the transformative periodic structure, upon removal of the critical macroscopic stress or strain, the polymeric periodic solids are recovered to their original form, said transformation being a result of an elastic instability and being reversible upon unloading and repeatable with successive loading excursions, wherein upon reaching said critical macroscopic stress, the ligaments buckle so as to produce a sudden transformation to an array of alternating ellipses.

2. The transformative periodic structure of claim 1, wherein said polymeric periodic solids comprise a square array of circular holes.

3. The transformative periodic structure of claim 1, wherein said polymeric periodic solids comprise a rectangular array of elliptical holes.

4. The transformative periodic structure of claim 1, wherein said polymeric periodic solids define a photonic crystal structure.

5. The transformative periodic structure of claim 1, wherein said polymeric periodic solids characterized by an initial affine-like deformation followed by homogeneous pattern transformation upon reaching the critical macroscopic stress or strain.

6. A method of forming a transformative periodic structure comprising:
    forming a plurality of polymeric periodic solids having a plurality of ligaments being coupled to a periodic array of similarly sized circular or elliptical holes defining a geometric pattern, with complex patterns from periodic structures and transforming the structural configuration of said polymeric period solids upon application of a critical macroscopic stress or strain said transformation alters the geometric pattern changing the spacing and the shape of the features within the transformative periodic structure, upon removal of the critical macroscopic stress or strain, the polymeric periodic solids are recovered to their original form or alternatively the new pattern can be retained upon cooling below a critical temperature such as the glass transition temperature and/or by cross-linking prior to unloading, said transformation being a result of an elastic instability and being reversible upon unloading and repeatable with successive loading excursions, wherein upon reaching said critical macroscopic stress, the ligaments buckle so as to produce a sudden transformation to an array of alternating ellipses.

7. The method of claim 6, wherein said polymeric periodic solids comprise a square array of circular holes.

8. The method of claim 6, wherein said polymeric periodic solids comprise a rectangular array of elliptical holes.

9. The method of claim 6, wherein said polymeric periodic solids define a photonic crystal structure.

10. The method of claim 6, wherein said polymeric periodic solids characterized by an initial affine-like deformation followed by homogeneous pattern transformation upon reaching the critical macroscopic stress or strain.

11. A transformative periodic structure comprising a multiple levels of periodicity having a plurality of ligaments being coupled to a periodic array of similarly sized circular or elliptical holes defining a geometric pattern that experiences a transformation in the structural configuration upon application of a critical macroscopic stress or strain, said transformation alters the geometric pattern within subdomains of periodicity changing the spacing and the shape of the features within these domains, said transformation being a result of an elastic instability and being reversible upon unloading and repeatable with successive loading excursions, wherein upon reaching said critical macroscopic stress, the ligaments buckle so as to produce a sudden transformation to an array of alternating ellipses.

12. The transformative periodic structure of claim 11, wherein said geometric pattern comprises a square array of circular holes.

13. The transformative periodic structure of claim 11, wherein said geometric pattern comprises a rectangular array of elliptical holes.

14. The transformative periodic structure of claim 11, wherein said geometric pattern define a photonic crystal structure.

15. The transformative periodic structure of claim 11, wherein said geometric pattern characterized by an initial affine-like deformation followed by homogeneous pattern transformation upon reaching the critical macroscopic stress or strain.

16. A method of tuning the photonic characteristics of a transformative periodic structure comprising:
    providing a plurality of polymeric periodic solids having a plurality of ligaments being coupled to a periodic array of similarly sized circular or elliptical holes defining a geometric pattern; and
    transforming the structural configuration of said polymeric period solids upon application of a critical macroscopic stress or strain by monotonically altering the geometric pattern changing the spacing and the shape of the features within the transformative periodic structure, upon removal of the critical macroscopic stress or strain, the polymeric periodic solids are recovered to their original form, said transformation being a result of an elastic instability and being reversible upon unloading and repeatable with successive loading excursions, wherein upon reaching said critical macroscopic stress, the ligaments buckle so as to produce a sudden transformation to an array of alternating ellipses.

17. The method of claim 16, wherein said polymeric periodic solids comprise a square array of circular holes.

18. The method of claim 16, wherein said polymeric periodic solids define a photonic crystal structure.

19. The method of claim 16, wherein said polymeric periodic solids characterized by an initial affine-like deformation followed by homogeneous pattern transformation upon reaching the critical macroscopic stress or strain.

20. A transformative photonic crystal structure comprising a plurality of polymeric periodic solids having a plurality of ligaments being coupled to a periodic array of similarly sized circular or elliptical holes defining a geometric pattern that experiences a transformation in the structural configuration upon application of a critical macroscopic stress or strain, said transformation alters the geometric pattern changing the spacing and the shape of the features within the transformative periodic structure, upon removal of the critical macroscopic stress or strain, the polymeric periodic solids are recovered to their original form, said transformation being a result of an elastic instability and being reversible upon unloading and repeatable with successive loading excursions, wherein upon reaching said critical macroscopic stress, the ligaments buckle so as to produce a sudden transformation to an array of alternating ellipses.

21. The transformative photonic crystal structure of claim 20, wherein said polymeric periodic solids comprise a square array of circular holes.

22. The transformative photonic crystal structure of claim 20, wherein said polymeric periodic solids comprise a rectangular array of elliptical holes.

23. The transformative photonic crystal structure of claim 20, wherein said polymeric periodic solids define a photonic crystal structure.

24. The transformative photonic crystal structure of claim 20, wherein said polymeric periodic solids characterized by an initial affine-like deformation followed by homogeneous pattern transformation upon reaching the critical macroscopic stress or strain.

* * * * *